US006574021B1

(12) United States Patent
Green et al.

(10) Patent No.: US 6,574,021 B1
(45) Date of Patent: Jun. 3, 2003

(54) REACTIVE COMBINER FOR ACTIVE ARRAY RADAR SYSTEM

(75) Inventors: Leon Green, Framingham, MA (US); Joseph A. Preiss, Westford, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/370,263

(22) Filed: Aug. 9, 1999

Related U.S. Application Data

(62) Division of application No. 08/778,201, filed on Dec. 30, 1996, now Pat. No. 5,977,911.

(51) Int. Cl.[7] .................................... H04B 10/04

(52) U.S. Cl. .................... 359/181; 359/195; 342/375; 342/157; 342/158; 342/371; 342/372; 342/368

(58) Field of Search .......................... 359/181, 193, 359/195, 124, 133; 342/375, 157, 158, 371, 372, 368

(56) References Cited

U.S. PATENT DOCUMENTS

| | | | | | |
|---|---|---|---|---|---|
| 4,725,844 | A | | 2/1988 | Goodwin et al. | |
| 5,164,735 | A | | 11/1992 | Reich et al. | |
| 5,222,162 | A | * | 6/1993 | Yap et al. | 385/14 |
| 5,247,309 | A | | 9/1993 | Reich | 342/368 |
| 5,305,009 | A | * | 4/1994 | Goutzoulis et al. | 342/157 |
| 5,369,410 | A | | 11/1994 | Reich | |
| 5,374,935 | A | | 12/1994 | Forrest | 342/368 |
| 5,555,119 | A | * | 9/1996 | Lewis | 359/158 |
| 5,583,516 | A | * | 12/1996 | Lembo | 342/375 |
| 5,591,962 | A | * | 1/1997 | Koishi et al. | 250/214.1 |
| 5,751,242 | A | * | 5/1998 | Goutzoulis et al. | 342/158 |
| 5,818,386 | A | | 10/1998 | Belisle | 342/372 |
| 5,933,113 | A | | 8/1999 | Newberg et al. | |
| 5,977,911 | A | * | 11/1999 | Green et al. | 342/375 |
| 6,061,159 | A | * | 5/2000 | Walsh | 359/152 |
| 6,337,660 | B1 | * | 1/2002 | Esman et al. | 342/375 |

OTHER PUBLICATIONS

Russell, M., et al., "Photonically controlled, wavelength division multiplexing (WDM) active array," *Society of Optical Engineers Meeting Proceedings*, 9 pages.

Proposal for Photonically Controlled Active Array, Raytheon Technical Proposal, pp. i–iv and Sections 2–1–2–39, Jan. 30, 1995.

* cited by examiner

*Primary Examiner*—Leslie Pascal
*Assistant Examiner*—Hanh Phan
(74) *Attorney, Agent, or Firm*—Hamilton Brook Smith & Reynolds, P.C.

(57) ABSTRACT

An active array radar system is controlled by photonic signals. The array of N antenna elements is divided into M subarrays, each having N/M antenna elements. Tunable lasers provide M optical wavelengths within non-overlapping bands. For reception, the microwave signals are optically modulated onto a single fiber for each subarray. Time delays are introduced for an offset between elements in a subarray and for an offset between subarrays. By using wavelength division multiplexing, a true time delay is attributed to each antenna element on the array. A non-coherent optical combiner having an array of N photodetectors demodulates the receive signals and recovers the coherent sum of the RF signals.

32 Claims, 20 Drawing Sheets

REACTIVE COMBINER FOR ACTIVE ARRAY RADAR SYSTEM

RELATED APPLICATION

This application is a divisional of U.S. application Ser. No. 08/778,201 filed Dec. 30, 1996, now U.S. Pat. No. 5,977,911 the entire teachings of which are incorporated herein by reference.

BACKGROUND OF THE INVENTION

Wideband multifunction radars are capable of concurrently performing hemispheric surveillance, tracking and simultaneously illuminating multiple targets in diverse environments. It is widely recognized that only active phased array antenna and radar systems with their inherent waveform flexibility, high stability and beam switching speed can successfully cope with this broad mission.

For the control of phased array radars, photonic architectures can be broadly characterized as either optically coherent or non-coherent. Although optically coherent architectures have been laboratory demonstrated on a limited scale, their application to a tactical system, where thousands of optical signals must be phase locked is not practical.

The performance issues facing active phased array radars are radio frequency (RF) bandwidth (shared multifunction apertures, imaging, adaptive nulling), true time delay steering (wide instantaneous bandwidth), electromagnetic interference (EMI) and beam steering control. Realizable active arrays providing this performance are limited in weight and size and are generally costly. In particular, transmit/receive T/R modules and array substructures are key cost drivers.

SUMMARY OF THE INVENTION

In accordance with the invention, photonic technology is applied to phased array radar systems. Preferably, the invention reduces cost, weight and size, while mitigating EMI, accommodating wider signal bandwidths and providing frequency independent beam steering of simultaneous multiple beams spanning multiple radar bands via the generation of true time delays. Solid state radar systems, airborne systems and shipboard systems can benefit from the invention.

The radar system comprises a plurality of subarrays of antenna elements and a plurality of optical carrier signals. Each antenna element belongs to a selected subarray and each optical carrier signal is within a unique, non-overlapping frequency band. A modulator modulates each optical carrier signal by a transmit radar signal. A time delay system employs wavelength division multiplexing of the modulated optical signals for each antenna element so as to direct a radar beam pattern from the array of antenna elements. A preferred embodiment of the invention is a planar array radar system having a true time delay wavelength division multiplexing architecture.

The radar array in accordance with the invention preferably includes N elements divided into M subarrays with n elements per subarray. A plurality of M tunable, single wavelength optical sources, with wavelengths $\lambda_1$ through $\lambda_M$, correspond to an element in each of the M subarrays. Other elements of the radar system include bi-directional photonic links, multiplexing to reduce parts count, and true time delay for all elements.

Beginning with the transmit function of the array, a transmission signal is amplitude modulated onto the carrier optical signals. After modulation, a star coupler multiplexes the M modulated optical signals onto M fibers, where they are time delayed, $t_1$ through $t_M$ via a dispersive optical delay line. These M time delays represent the relative delays between the elements of each of the M subarrays. Each of the optical signals then require an additional time delay of $T_1$ through $T_M$ from binary non-dispersive Time Delay Units (TDU) to create a linear phase front. These M time delays adjust for the relative offsets between subarrays.

The optical output signals are then split n times, filtered and distributed to the n elements in the corresponding subarray. The optical filters are tuned to select the time delay corresponding to the element location within a subarray. That is, the optical filter for the $m^{th}$ element of each subarray is tuned to pass the optical signal $\lambda_m$ and reject the others. At the array, a photodiode removes the time delayed microwave signal from the optical carrier, and upon amplification, the microwave signal is transmitted.

For the receive function of the architecture, the microwave signal is routed, in reverse, through the signal chain. The modulated optical signals from a subarray are combined on a single fiber, and acquire the corresponding subarray time delays $T_1$ through $t_m$. The signals from a subarray are then divided and filtered in the same manner as for transmit. After filtering, only $M^2$ modulated optical signals with the proper time delays remain. Prior to combining, these signals are attenuated to realize the desired array amplitude taper on receive.

To avoid the problems associated with coherent combining, a specific non-coherent optical combiner is utilized. This device, through a photodetector array, demodulates the links and recovers the coherent sum of the RF signals. Preferably, there is one photodetector for each antenna element in the radar array. A phase shifter can also be used to introduce a phase shift into selected photodetector outputs. In a particular preferred embodiment, the photodetectors are fabricated as Metal-Semiconductor-Metal devices on a common substrate.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
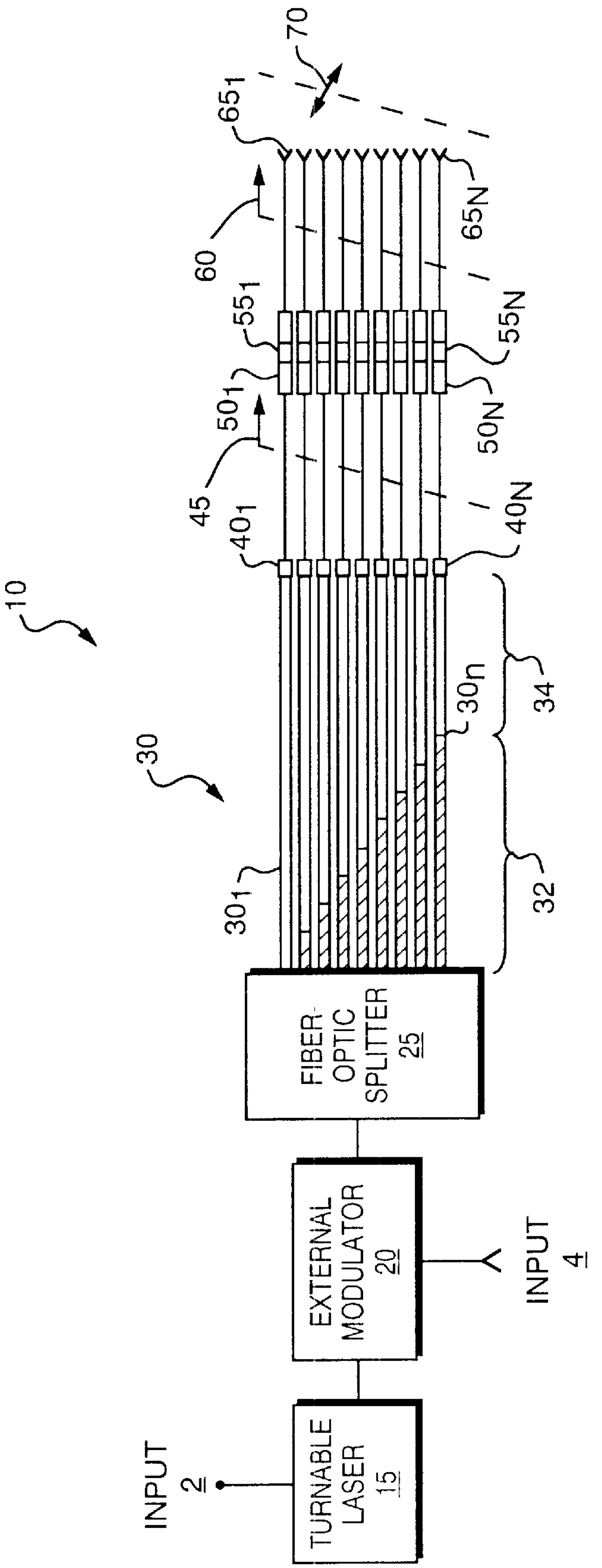
FIG. 1 (PRIOR ART)
FIG. 1 is a schematic diagram of an antenna architecture embodying dispersive fiber true time delay.

The distribution of RF signal energy and array logic through an optical fiber network introduces many potential benefits for active phased arrays. These benefits include, but are not limited to, true time delay architectures, multi-beam, multi-function shared apertures, reduced T/R module complexity, and denser array integration. A further advantage of fiber-to-module architecture is the light weight, broad bandwidth and small size of the fiber, which makes it practical to move much of the RF combining hardware back from the array face into remote racks of equipment.

For the control of phased array radars, photonic architectures can be broadly characterized as either optically coherent or non-coherent. An optically coherent architecture is one whose implementation requires the phase tracking of two or more optical signals. Although coherent architectures have been demonstrated on a limited scale in laboratory environments, their application to a fielded system, where tens of thousands of optical signals must be phased locked, is not practical. To illustrate the problems associated with optical coherence, a single photodetector illuminated by two optical signals will now be discussed.

The total optical field, which is the sum of the two optical signals, is given by $$A[\cos(w_1 t)+\cos(w_2 t+\phi)]$$

where $A^2$ is the baseband signal strength (RF or DC voltage);

$w_1$ is the optical frequency of a first optical signal;

$w_2$ is the optical frequency of a second optical signal; and $\phi$ is the phase shift value.

Ignoring higher order terms, the photodiode current, which is proportional to the total incident optical power, is proportional to $$A^2[1+\cos((w_1-w_2)t-\phi)].$$

For an optically coherent transmit architecture, generation of an RF signal is realized by the beating of two optical signals at different frequencies. The separation of the two unmodulated optical signals is equal to the desired RF frequency $w_{RF}$. Ignoring the dc component, the photodiode current is given by $$A^2\cos(w_{RF}t-\phi).$$

There are two problems associated with generating an RF signal in this fashion. First, the phase of the resulting RF signal is equal to the optical phase. Constant and varying optical phase errors caused by thermal variations, microphonic vibrations, and fiber strain will cause undesired RF phase offsets and phase modulations. The other problem is the frequency stability of the laser sources. For lasers in the 1.5 μm wavelength band, a wavelength change of 0.01% (i.e. 0.15 nm) results in a 20 GHz shift of the RF signal. Maintaining the laser source wavelength to this accuracy, even with active compensation, is impractical given the typical environment of a fielded system.

For an optically coherent receive architecture, combining of microwave signals is realized by the coherent combining of optical signals with a single photodetector. The photodiode current is given by $$A^2[1+\cos(\phi)].$$

As can be seen from the expression, the microwave current can vary between 0 and $2A^2$ depending upon the relative phase of the two optical signals. For the reasons stated above, the relative phase between optical signals is random and time variant. On average, however, the microwave current will equal $A^2$, which represents a 6 dB reduction in maximum RF power.

A non-coherent optical system does not experience the problems of high combining loss, poor signal phase stability, and undesired frequency modulation associated with coherent schemes. A non-coherent architecture relies on maintaining the coherence of microwave signals, as opposed to coherent architectures which require optical coherence. For this reason, a photonic architecture which relies on optical coherence is not considered further.

The advantages and disadvantages of three non-coherent optical architectures are discussed below. The architectures are:

(i) dispersive fiber true time delay;

(ii) time delay per unit per radiating element; and (iii) wavelength division multiplexing.

These three non-coherent architectures represent a broad spectrum of approaches. Of the photonic architectures, wavelength division multiplexing represents the best compromise between architecture complexity and array performance. A summary of the comparison performed for the three photonic architectures is presented below in Table I.

TABLE I

PHOTONIC ARCHITECTURE COMPARISON

| Array Features | Dispersive Fiber True Time Delay | Time Delay Unit Per Element | Wavelength Division Multiplexing |
|---|---|---|---|
| Adaptive Beam Reconfiguration | Non-existent | Element level | Subarray level |

TABLE I-continued

PHOTONIC ARCHITECTURE COMPARISON

| Array Features | Dispersive Fiber True Time Delay | Time Delay Unit Per Element | Wavelength Division Multiplexing |
|---|---|---|---|
| Array Time Delay Calibration | Non-existent | Element level | Subarray level |
| Array Amplitude Calibration | Element level | Element level | Element level |
| Component Count | Low | High | Low |
| Array Logic | Simple | Complex | Moderate |
| Simplified Module | Yes | Yes | Yes |
| Relative Cost | Low | High | Moderate |

A comparison of the quantities of high cost optical components for each of the three photonic architectures is presented below in Table II. The comparison is based on a photonic implementation of an array containing 4,300 elements. As can be seen from the comparison, the wavelength division multiplexing scheme does not have the high component count associated with a system having a time delay unit behind each radiating element architecture, and it will be shown, that it does not suffer the limitations of the dispersive fiber true time delay architecture.

TABLE II

COMPARISON OF THE NUMBER OF PHOTONIC COMPONENTS

| | Lasers | Modulators | Time Delay Units |
|---|---|---|---|
| Dispersive Fiber True Time Delay | 2 | 4,458 | 146 |
| Time Delay Unit per Element | 1 | 4,301 | 4,300 |
| Wavelength Division Multiplexing | 66 | 4,366 | 132 |

Dispersive Fiber True Time Delay Architecture

FIG. 1 is a schematic diagram of an antenna architecture embodying dispersive fiber true time delay. The physical phenomenon upon which this architecture 10 is based is the variation of group delay (time delay) with wavelength in a length of dispersive optical fiber. The time delay through a dispersive fiber is given by $$T=\frac{\ln(\lambda)}{c}\left(1-\frac{\lambda}{n}\frac{dn}{d\lambda}\right)\cong\frac{\ln(\lambda)}{c}$$

where l is the length of the fiber;

n(λ) is the index of refraction as a function of wavelength; and c is the speed of light.

From this relationship, it is apparent that time delay in a dispersive fiber can be controlled by varying the wavelength of the optical signal.

The optical signal from a single wavelength, tunable laser 15 is amplitude modulated with a microwave transmit pulse 4 in an external modulator 20. A fiber optic splitter 25 splits the optical signal N ways, and distributes the signal to each of the N elements of a linear array 65. At each array element $65_1, \ldots, 65_N$, the microwave signal is removed from the optical carrier by a transmit/receive module $55_1, \ldots, 55_N$, RF amplified, and transmitted.

As the modulate signal is distributed to the array 65, the N signals propagate through an optical fiber network 30 where each signal propagates through a respective optical fiber $30_1, \ldots, 30_N$. Each optical fiber $30_1, \ldots, 30_N$ includes a respective length of dispersive fiber $32_1, \ldots, 32_N$ and a respective length of non-dispersive fiber $34_1, \ldots, 34_N$. The lengths of dispersive fibers 32 are varied by a constant incremental increase in dispersion to produce a constant relative linear time delay between elements 65. The lengths of non-dispersive fibers 34, connecting the dispersive fibers 32 to the array 65, are trimmed to compensate for this time delay at a specified nominal optical wavelength. As the optical wavelength deviates from nominal, a linear time delay 60 is produced across the array 65. The slope of the time delay, and therefore the scan angle of the array, is related to the change in optical wavelength and the fiber dispersion. With this architecture, the array is scanned by simply changing the wavelength of the optical source.

As illustrated, the optical signals are converted to an electrical signal by respective photodetectors $40_1, \ldots, 40_N$ to transmit/receive lines $50_1, \ldots, 50_N$ of transmit/receive modules $55_1, \ldots, 55_N$. Also illustrated are phasefronts 45 within the lines 50. The resulting transmission time delay 60 steers the transmit beam 70 exiting the array 65.

Figure 2:
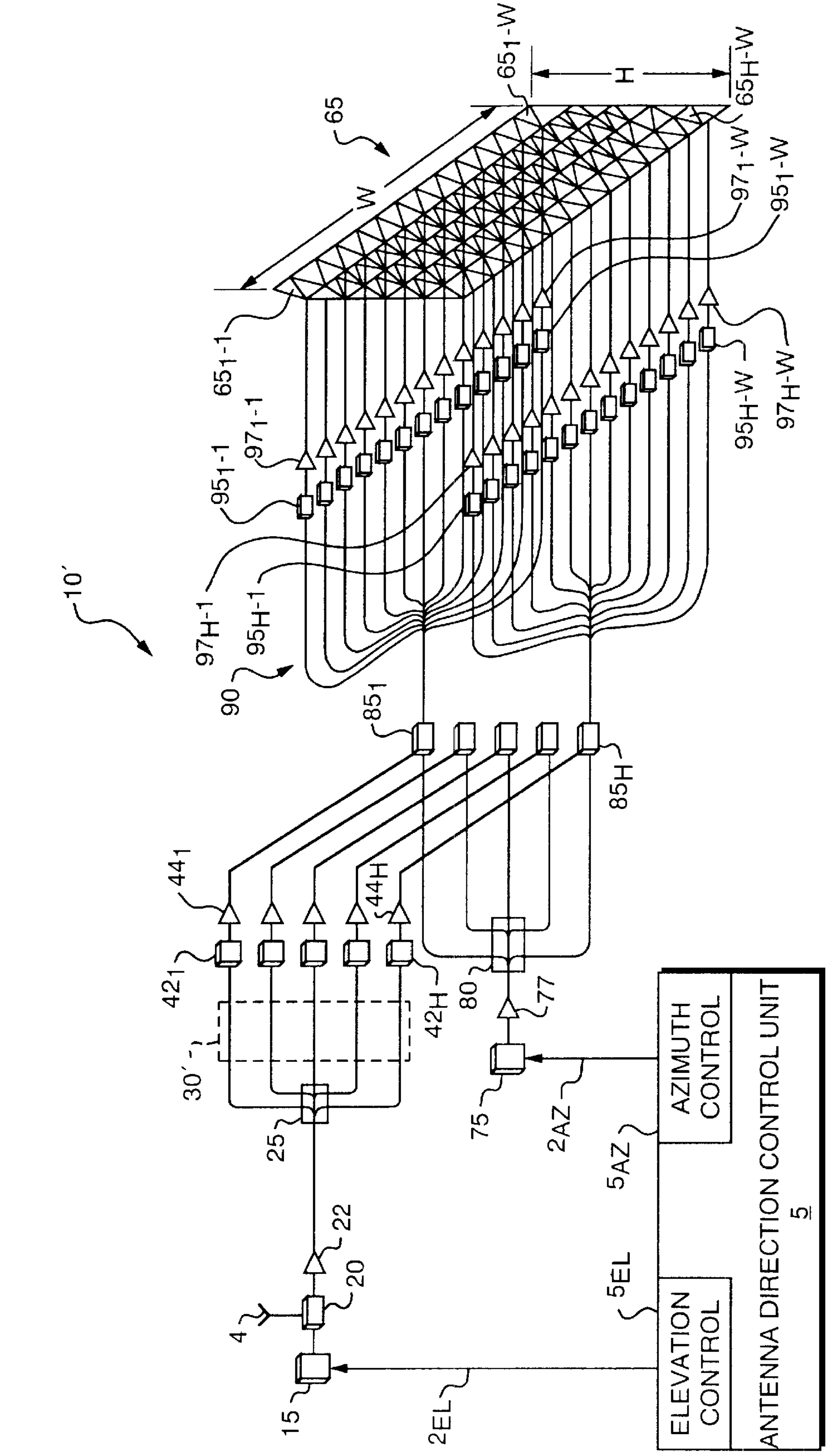
FIG. 2 (PRIOR ART)
FIG. 2 is a schematic diagram of an array architecture which expands the linear array of FIG. 1 into a planar configuration.

FIG. 2 is a schematic diagram of an array architecture 10' which expands the linear array of FIG. 1 into a planar configuration. The system includes an antenna direction control unit 5 having an elevation control circuit $5_{EL}$ and an azimuth control circuit $5_{AZ}$. The elevation control circuit $5_{EL}$ and the azimuth control circuit $5_{AZ}$ output respective laser tuning signals $2_{EL}$, $2_{AZ}$ to a respective tunable laser 15, 75 as a change in wavelength $\Delta\lambda_r$, $\Delta\lambda_c$. The antenna array 65 includes H rows and W columns of elements. For ease of description, the antenna array 65 is illustrated as having 5 rows (H=5) and 13 columns (W=13).

In elevation, the tunable laser 15 transmits an optical wavelength over a fiber optic cable to an external modulator 20 which modulates a radar signal input signal 4 onto the optical signal. This modulated optical signal is transmitted over a fiber optic cable to an optical modulator 22. An optical splitter 25 divides the signal from the optical modulator 22 into a plurality of H channels. The optical signals then pass through a first varying dispersion fiber set 30' where each channel passes through a different length of fiberoptic cable to a respective photodetector $42_1, \ldots, 42_H$. The photodetectors convert the optical signal into an electrical signal which is amplified by a respective elevation amplifier $44_1, \ldots, 44_H$.

In azimuth, the tunable laser 75 generates an optical wavelength on a fiber optic cable to an optical modulator 77. The resulting optical signal is split into a plurality of H channels by an optical splitter 80.

An external modulator $85_1, \ldots, 85_H$ combines the electrical signals from the elevation amplifier $44_1, \ldots, 44_H$ with the azimuth optical signals. Each of the external modulators $85_1, \ldots, 85_H$ provides a plurality of W optical signals to a respective second varying dispersion fiber set $90_1, \ldots, 90_H$. Each optical signal is received by a respective photodetector $95_1$-1, . . . , $95_1$-W, . . . , $95_H$-1, . . . , $95_H$-W which converts the optical signal to an electrical signal amplified by respective transmission amplifier $97_1$-1, . . . , $97_1$-W, . . . , $97_H$-1, . . . , $97_H$-W. The amplified electrical signal is provided to an antenna element in an array of antenna elements 65.

Although the depicted architectures 10, 10' focus on the transmit function, they can be modified to accommodate the receive function of the array. However, the architectures 10, 10' do not allow for optical devices, except for the lasers, to be utilized for both transmit and receive.

The best feature, and greatest drawback, of a dispersive fiber true time delay architecture is its simplicity. Large numbers of precisely controlled optical components are not required, and all beamforming and steering functions are removed from the array face and T/R module. Simplicity of the architecture, however, is realized by reducing the capabilities of the active phased array because the dispersive fiber true time delay architecture can only realize a separable, linear time delay across a planar array aperture. This is sufficient to steer the array, but does not allow for nonlinear phase excitations required for adaptive beam shaping or nulling.

Time Delay Unit Per Element Architecture

Figure 3:
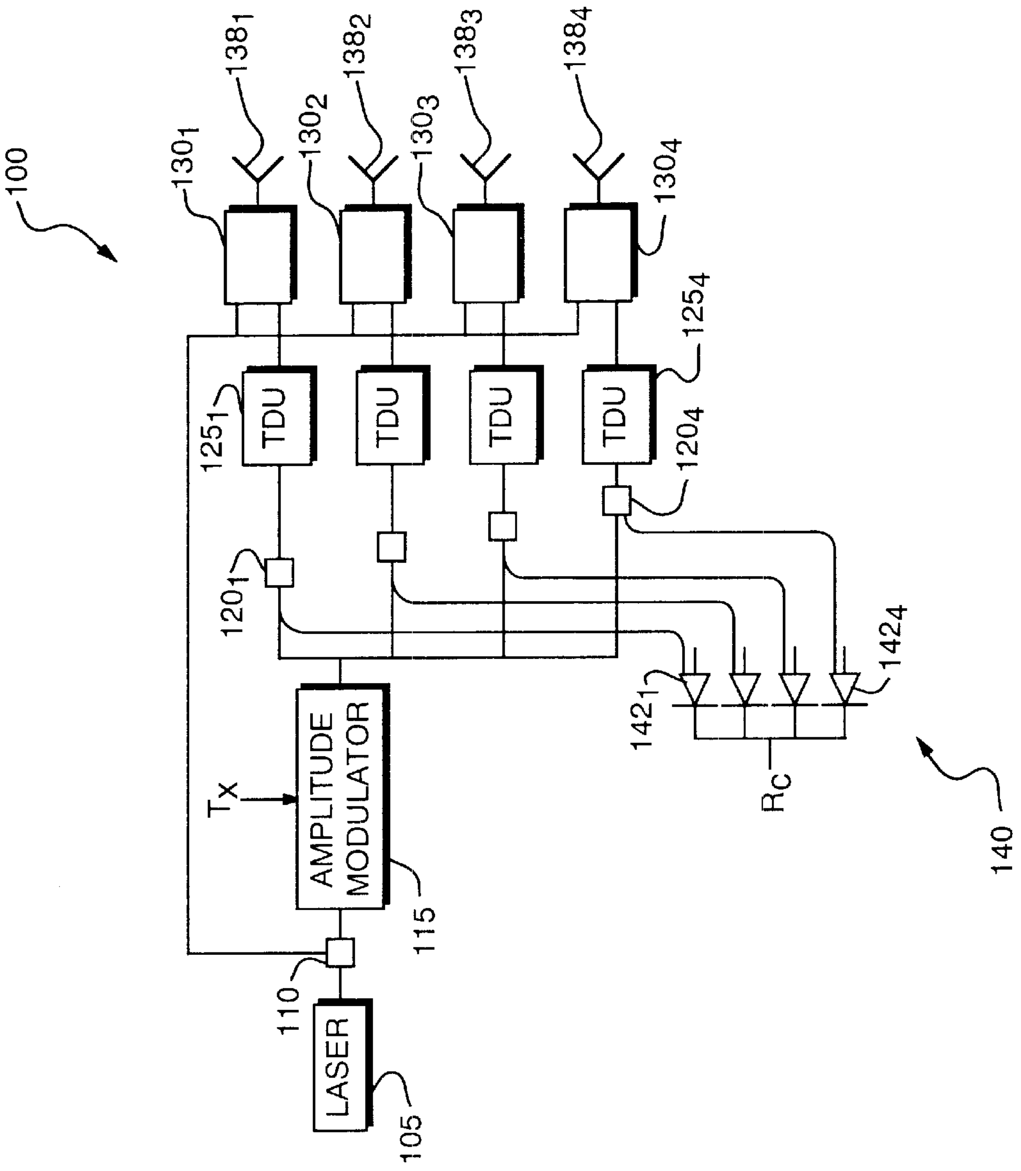
FIG. 3 is a schematic diagram of an antenna array utilizing a time delay unit per element architecture.

FIG. 3 is a schematic diagram of a radar system utilizing a time delay unit per element architecture. The laser 105 generates a wavelength of light over a fiberoptic cable to an amplitude modulator 115. A first optical switch 110 between the laser 105 and the amplitude modulator 115 provides the optical signal to the amplitude modulator 115 for use in forming a transmit signal and to the transmit/receive modules 130 for use in forming a receive signal.

For transmission, the amplitude modulator 115 modulates the optical signal by a transmit waveform Tx. The amplitude modulated optical signal is dispersed over varying lengths of fiberoptic cable to a plurality of second optical switches 120. Each optical switch $\mathbf{120}_1, \ldots, \mathbf{120}_N$ receives the respective channel from the amplitude modulator 115. The optical switches 120 also provides received optical signals to a non-coherent reactive combiner circuit 140. The combiner 140 includes a photodetector array $\mathbf{142}_1, \ldots, \mathbf{142}_4$ for combining the optical receive signal into a combined microwave signal $R_c$.

For transmission, the amplitude modulated optical signal is provided to a respective time delay unit (TDU) $\mathbf{125}_1, \ldots, \mathbf{125}_N$. The output from the TDUs are optical signals which are provided to a respective transmit/receive module $\mathbf{130}_1, \ldots, \mathbf{130}_N$. Each transmit/receive module transmits an electrical signal to a respective antenna element $\mathbf{138}_1, \ldots, \mathbf{138}_N$ for transmission and receipt.

For ease of description, the radar 100 is illustrated with a four-element (N=4) antenna array 130. A brute force approach to achieving full active array capabilities, with a true time delay architecture, is to place a time delay unit (TDU) 125 behind every radiating element 138 of the array. For the transmit function of the architecture, an optical signal, amplitude modulated with the transmit microwave pulse, is divided four ways, time delayed and distributed to the corresponding T/R module 130. In the module, the microwave signal is removed from the optical carrier, RF amplified and transmitted.

For the receive function of the architecture, the optical modulation and time delay is achieved in the same fashion as for transmit. By utilizing optical switches, the same TDUs and optical source can be shared for both transmit and receive. The formation of the receive beam is realized in the non-coherent reactive combiner 140. The best feature of this combiner 140 is that it does not suffer the losses associated with coherent optical schemes.

The time delay unit per element architecture is non-coherent, which simplifies he T/R module and realizes full active array capabilities. A problem with this architecture is the prohibitive cost of the time delay units which are required behind each element. This architecture is, therefore, not viable for large arrays.

Wavelength Division Multiplexing Architecture

While providing the benefits associated with photonics, wavelength division multiplexing represents a beneficial compromise between component reduction and array performance. The component reduction is realized through the sharing of time delay units made possible by the wavelength division multiplexing approach. The array is capable of producing the complex aperture excitations necessary for beam shaping and adaptive nulling.

Figure 4:
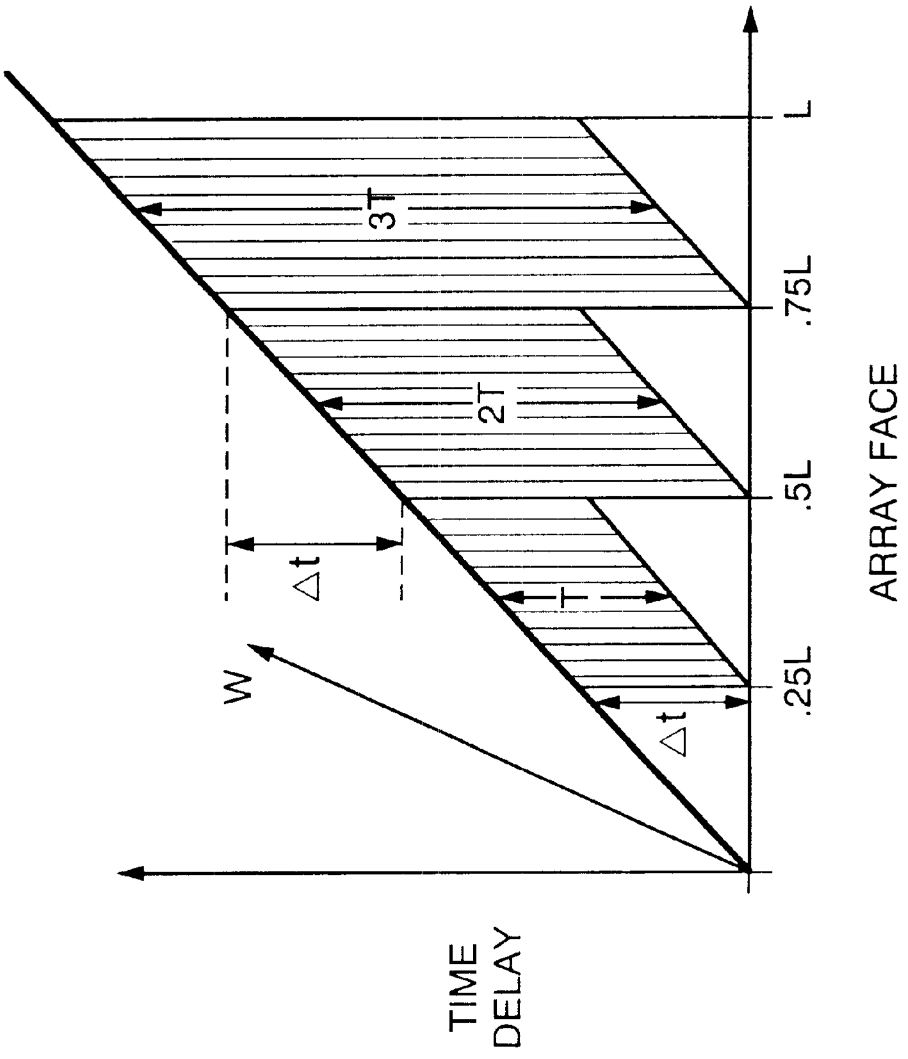
FIG. 4 is a graphical diagram of a time delay across an array face in a wavelength division multiplexing architecture.

FIG. 4 is a graphical diagram of a time delay across an array face in a wavelength division multiplexing architecture. Assuming a linear array of N elements having a length L and a width W, the array can be divided into M subarrays of N/M elements. As shown, the time delay variation across a subarray Δt is identical for every subarray, except for a constant offset between subarrays ΔT. If multiplexing of time delay units is utilized, N/M TDUs are required to create the required time delay across each subarray, while M TDUs create the proper offset between subarrays. Configuring the array as $N^{1/2}$ subarrays of $N^{1/2}$ elements, realizes the minimum number of time delay units, $2N^{1/2}$ TDUs. The optimal configuration of a planar array of N elements is identical.

Figure 5:
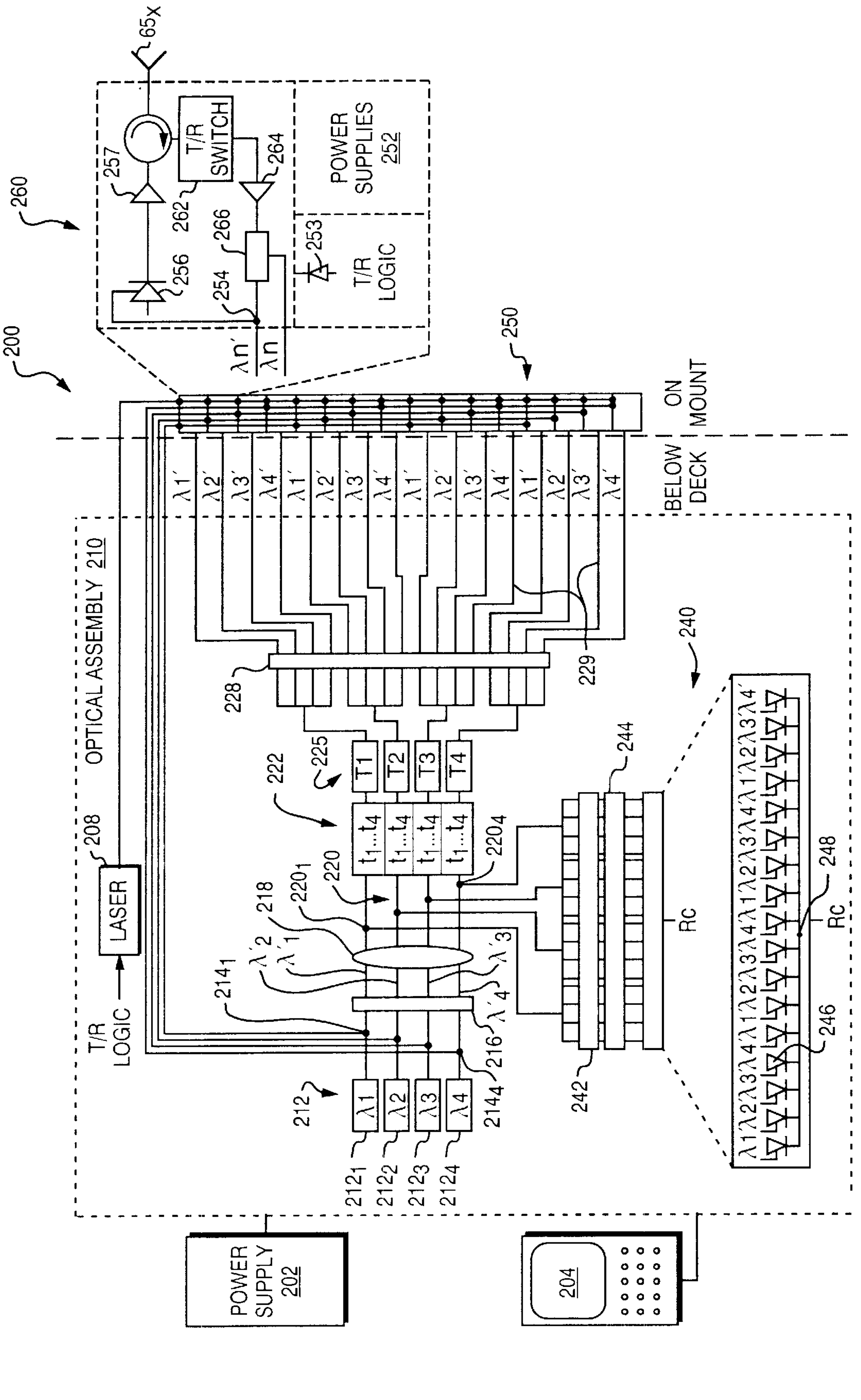
FIG. 5 is a schematic block diagram of a true time delay wavelength division multiplexing architecture embodied in a 16 element planar array.

FIG. 5 is a schematic block diagram of a true time delay wavelength division multiplexing architecture embodied in a sixteen element (N=16) planar array. An optical assembly 210 is powered by a power supply 202 and controlled via a control assembly 204. An array assembly 250 is mounted in an array housing faced with antenna elements. The optical assembly 210 is preferred located remote from the array housing, such as below ground, below a ship's deck, or within the interior of a plane.

The operation of the architecture 200 will first be discussed with the transmit function of the array. Four individually tunable, single wavelength optical sources (e.g., tunable lasers) $\mathbf{212}_1, \ldots, \mathbf{212}_4$, with nominal wavelengths $\lambda_1$ through $\lambda_4$, are used to provide the time delays within subarrays. To avoid accidental coherence effects as discussed above, the wavelengths are assigned separate, non-overlapping bands. Four optical switches $\mathbf{214}_1, \ldots, \mathbf{214}_4$ send the optical signals from the sources $\mathbf{212}_1, \ldots, \mathbf{212}_4$ to be amplitude modulated with the microwave transmit signal Tx in an amplitude modulator 216. After modulation, a star coupler 218 multiplexes the four modulated optical signals $\lambda'_1, \ldots, \lambda'_4$ onto four fibers. Four optical switches $\mathbf{220}_1, \ldots, \mathbf{220}_4$ then route these signals $\lambda'_1, \ldots, \lambda'_4$ through equal lengths of dispersive fiber 222, where they are time delayed by times $t_1$, through $t_4$. These elemental time delays $t_1, \ldots, t_4$ are realized using the dispersion fiber true time delay relationship presented above; the wavelengths of the optical sources are tuned to achieve the desired time delays. Each of the optical signals then acquire an additional subarray time delay of times $T_1$ through $T_4$ in binary TDUs $\mathbf{225}_1, \ldots, \mathbf{225}_4$. These four subarray time delays $T_1, \ldots, T_4$ are the relative offsets between subarrays. The signal at the output of the time delay unit $t_n$ is given by the series $$Tx(t-t_1-T_n)\cos(w_1(t-t_1-T_n))+Tx(t-t_2-T_n)\cos(w_2(t-t_2-T_n))+\ldots$$

where

Tx(t) is the microwave signal; and $w_m$ is the optical frequency $(2\pi c/\lambda_m)$.

Each optical output signal is then split four times, filtered by a bandpass or tunable optical filter $\mathbf{228}_1$-1, . . . ,$\mathbf{228}_4$-4, and distributed on compensated lengths of non-dispersive fiber to the four elements in the corresponding subarray. The optical filters 228 are tuned to select the laser wavelength band, and thus time delay, corresponding to the element location within a subarray. That is, the optical filter $\mathbf{228}_1$-m, $\mathbf{228}_2$-m, $\mathbf{228}_3$-m, $\mathbf{228}_4$-m for the $m^{th}$ element of each subarray is tuned to pass the optical signal $\lambda'_m$ and reject the others. The signal arriving at the $m^{th}$ element of the $n^{th}$ subarray is given by $$Tx(t-t_m-T_n)\cos(w_m(t-t_m-T_n))$$

where $t_m-T_n$ is the desired time delay.

Figure 6:
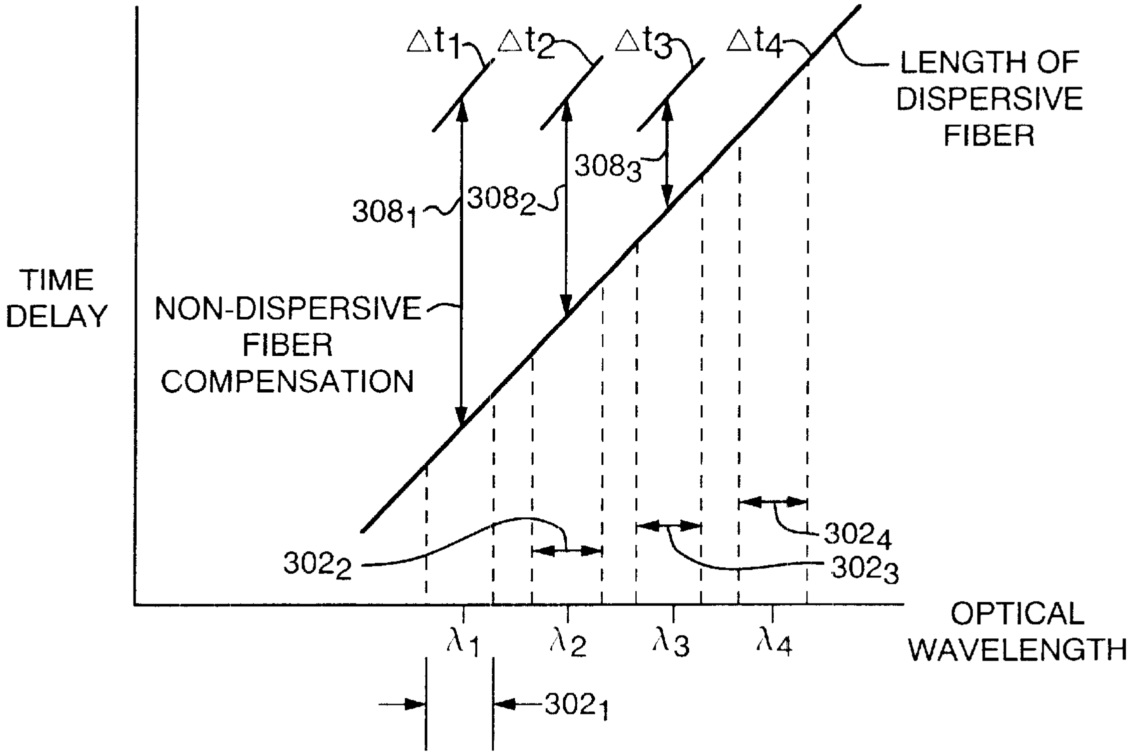
FIG. 6 is a graphical diagram of time delay vs. optical wavelength.

FIG. 6 is a graphical diagram of time delay versus optical wavelength. As illustrated, the lengths of non-dispersive fibers are trimmed so there is no relative time delay between elements when the lasers are tuned to their nominal wavelengths $\lambda_1, \ldots, \lambda_4$ within the laser tuning range $\mathbf{302}_1, \ldots, \mathbf{302}_4$. Also illustrated is the relationship between the length of dispersive fiber 306 and the resultant element time delay $\Delta t_1, \ldots, \Delta t_4$; the difference between the two being defined as the non-dispersive fiber compensation $\mathbf{308}_1, \ldots, \mathbf{308}_4$.

Returning to FIG. 5, third optical switches 254 in the T/R modules at the array 260 route the optical signal to a photodetector where the time delayed microwave signal is removed from the optical carrier, amplified by a transmission amplifier 257 and transmitted.

For the receive function of the architecture, the three optical switches 214, 220, 254 are commanded to their receive states. The optical signals $\lambda_1, \ldots, \lambda_4$ are selectively distributed to the T/R modules 260. That is, the optical signal $\lambda_m$ is only distributed to the $m^{th}$ element of each of the subarrays. Within the T/R module 260, the received microwave signal passes through a microwave T/R switch 262 and is amplified by a receiver amplifier 264 and impressed onto the optical carrier by an amplitude modulator 266. The modulated signal is then routed, in reverse, through the signal chain.

Control of the optical switch 254 and the microwave T/R switch 262 is implemented over a separate optical fiber. Each T/R module 260 includes a power supply 252 and a T/R logic module 253. The T/R module 260 is optically controlled from the T/R logic module 253. Logic commands are carried on a logic wavelength $\lambda_{logic}$ generated by a common laser source 208, as shown.

The modulated optical signals from a subarray are combined on a single fiber and acquire the corresponding subarray time delays $T_1$ through $T_4$ plus the elemental time delays of $t_1$ through $t_4$. The signals from a subarray are then divided and filtered in the same manner as for transmit. After filtering, only sixteen modulated optical signals with the proper time delays remain. Prior to combining, these signals are attenuated to realize the desired array amplitude taper on receive.

To avoid the problems associated with coherent combining, the radar system 200 preferably utilizes a non-coherent reactive combiner 240. The optical signals are provided by the second optical switch 220 and passed through a bandpass or tunable optical filter network 242 to an optical attenuator network 244. The attenuated optical receive signals are passed to the non-coherent reactive combiner 240 to yield a combined microwave receive signal Rc. Each signal is converted by a respective photodiode 246 into an electrical signal. A one-bit phase shifter 248 in the combiner is needed to form monopulse patterns. Further details of the combiner 240 are discussed below.

The four laser frequencies $\lambda_1$, $\lambda_2$, $\lambda_3$, $\lambda_4$ must be unique to preserve non-coherent combining. If the optical frequency bands were the same, at broadside each filter would pass four optical signals of identical frequency but random phase. Illuminating a single photodetector in this fashion incurs the same losses associated with coherent combiners.

The wavelength division multiplexing architecture realizes the performance of a conventional electronic active phased array while providing the following benefits:

remote beamforming;

simplified T/R module;

time delay steering with reduced TDU count;

improved logic distribution;

active array performance through subarray synthesis; and array calibration.

Remote beamforming and simplified, smaller T/R modules offer many benefits which cannot be realized with conventional electronic architectures. These advantages include reduced array cross-section and top-side weight reduction. The simplification of the T/R module, which is now less expensive and more reliable, and the removal of the conventional beamformers and logic distribution also provide array designers with greater flexibility including the integration of power supplies and T/R modules, non-protruding conformal arrays, simultaneous multi-beam functions, and enhanced array packaging and thermal designs. The benefits of time delay steering, logic distribution, subarray synthesis and array calibration are discussed in more detail below.

Arrays are steered by establishing an RF wavefront that is in-phase along the perpendicular to a line in the direction of the desired beam pointing. This can be accomplished by phase steering or true time delay steering. In conventional active phased arrays, phase steering is implemented with phase shifters which ideally produce a phase offset which is independent of frequency. Because the desired scan angle and operational frequency determine the required phase shifter settings, phase steering is inherently narrow band. An RF signal, other than a single tone, will be degraded due to the dispersion of a phase-steered array. As the frequency deviates from that for which the phase shifters are set, the beam squints, resulting in a loss of transmitted or received signal. The degree of beam squint is proportional to the instantaneous bandwidth of the signal, the electrical size of the array/subarray and the scan angle.

Using true time delay steering, the array acts as if it has infinite bandwidth and does not suffer the loss associated with phase steering. Each TDU setting is determined by the path length difference from the array to the RF wavefront. This equalizes the RF path length and produces an RF wavefront which is independent of frequency.

Because of the losses and cost associated with electronic TDUs, a true time delay steering array is not implemented at the element level. Typically, phase steering dispersion loss is traded off against time delay steering TDU loss, and a hybrid steering system is implemented and consists of subarray time delay steering and phase steering within a subarray. Although this improves the frequency performance, conventional electronic phased arrays are still inherently narrow band.

By utilizing photonics, a true time delay steering array, which allows for wider instantaneous bandwidth for improved imaging and multi-function apertures is practical. The additional benefits of the wavelength division multiplexing are the reduction in the number of time delay units and the remoting of the beamforming and steering components. These advantages provide a more compact architecture, reduced cost, and a practical implementation of multi-beam, shared apertures.

Figure 7A:
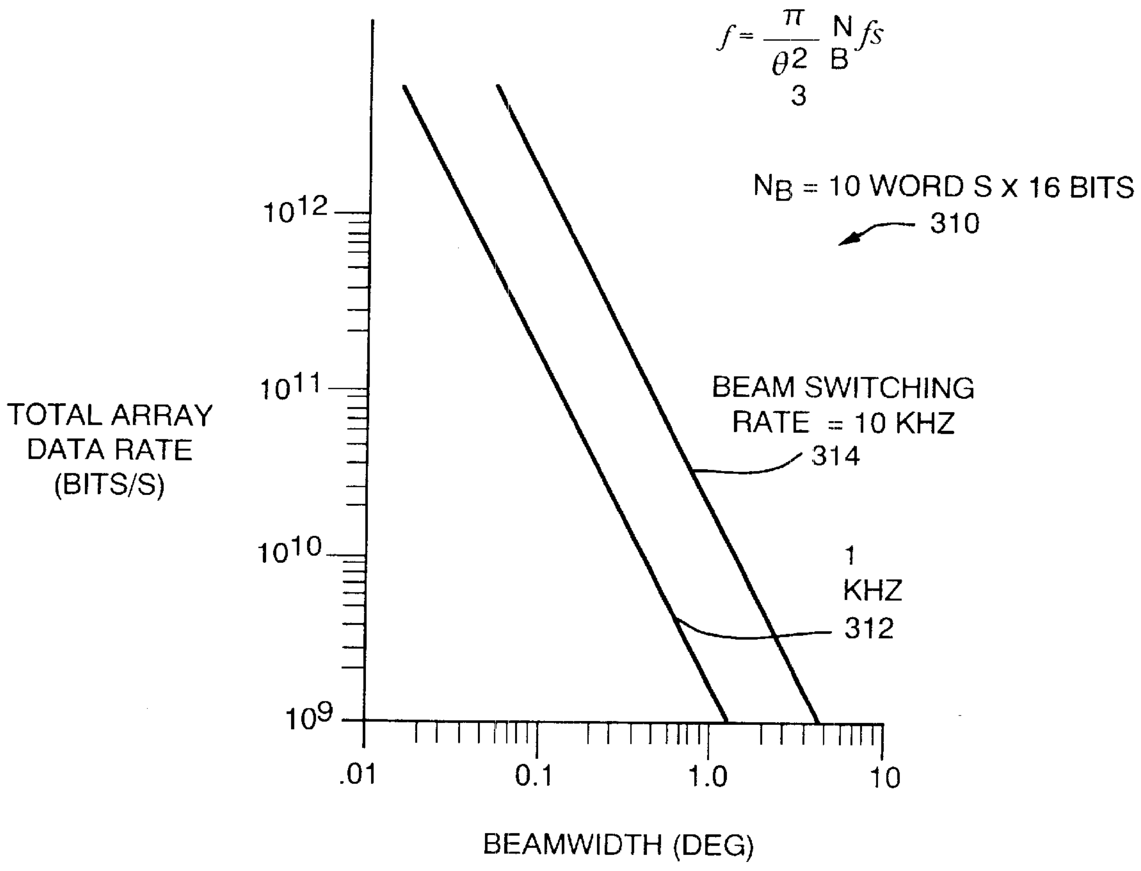
FIGS. 7A–7B are graphical diagrams illustrating logic complexity for a fully adaptive phased array radar system.
Figure 7B:
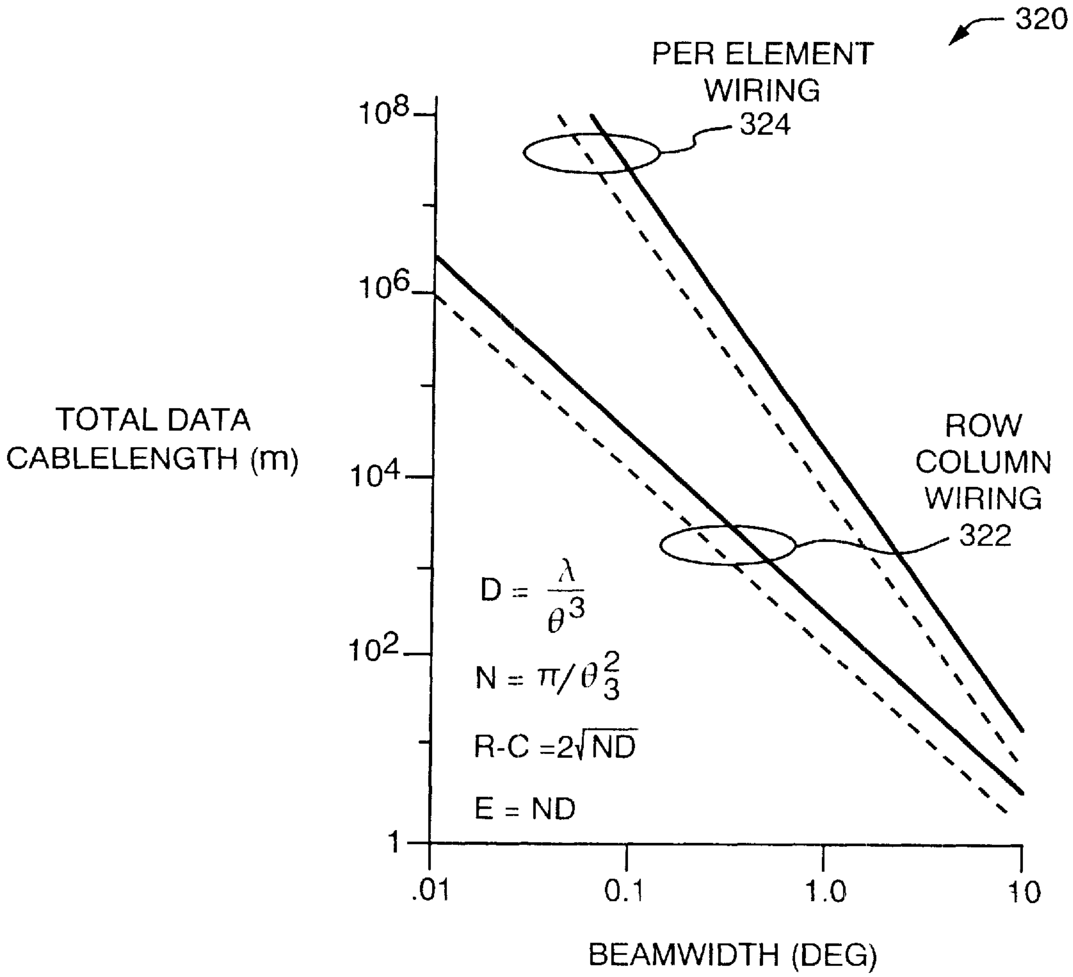

FIGS. 7A–7B are graphical diagrams illustrating logic complexity for a fully adaptive phased array radar system. For multiple beam applications, beam forming rates of 1 to 10 KHz are typical. For large fully adaptive arrays with many thousands of elements, the overall array command rates can easily require data rates over many Gbits/sec. The dependency of the control wiring complexity—both in total array data rate (FIG. 7A) and in total control cable length (FIG. 7B)—with the radar beamwidth is shown for conventional active phased array radars.

The antenna beamwidth is inversely proportional to the number of elements across the linear array dimension and thus to the square root of the total number of elements. As can be seen, data rates can easily exceed 1 Gbit/s for beam switching rates of 1 KHz 312 to 10 KHz 314 for beamwidths of a degree or less. Corresponding cable lengths for row-column wiring 322 and per element wiring 324 can easily exceed one kilometer. With conventional architectures, the distribution of command words to the array is by ribbon cable, coax, multi-layer or wire wrap boards, which are bulky and expensive in acquisition and installation.

A preferred wavelength division multiplexing architecture significantly reduces the complexity of the array logic distribution as compared to conventional active phased arrays. Conventional active phased arrays required “smart” T/R modules, which include phase shifters, attenuators and logic arrays. With photonics, these functions are performed by components which are significantly smaller and remoted from the array. The only logic to the T/R module which remains, is a single control line distributed to the array with photonics which commands the modules to transmit or receive. The “smarts” in the thousands of T/R modules are replaced by a central processor which determines the required laser, filter, time delay and attenuator settings. With the reduced number of components, smaller physical size and proximity to the processor, a preferred embodiment of the invention employs a back plane logic distribution within these component blocks. In this manner each individual device within the block is addressed simultaneously, as opposed to serially. This significantly improves the flexibility of active phased arrays as the re-configuration time to provide adaptive capabilities is achieved in a fraction of the time presently required by conventional arrays.

The enhanced array logic distribution realized through photonic architectures, also mitigates several of the EMI problems typically encountered in conventional phased arrays. The corruption of the logic signals generally encountered in conventional arrays is in the T/R module and in the logic distribution from the beam steering generator to and within the array. The interference in the module is the result of digital cross talk and radiated noise generated by RF components and pulsed power supplies. This problem is solved with photonics by removing all but the T/R control from the module. The other area of concern is the interference which occurs in the distribution of the logic signals. In conventional arrays long runs of the logic and power lines are closely spaced which results in cross-talk and noise. The implementation of the architecture with photonics also removes this problem as logic and power distributions are separated.

Figure 8A:
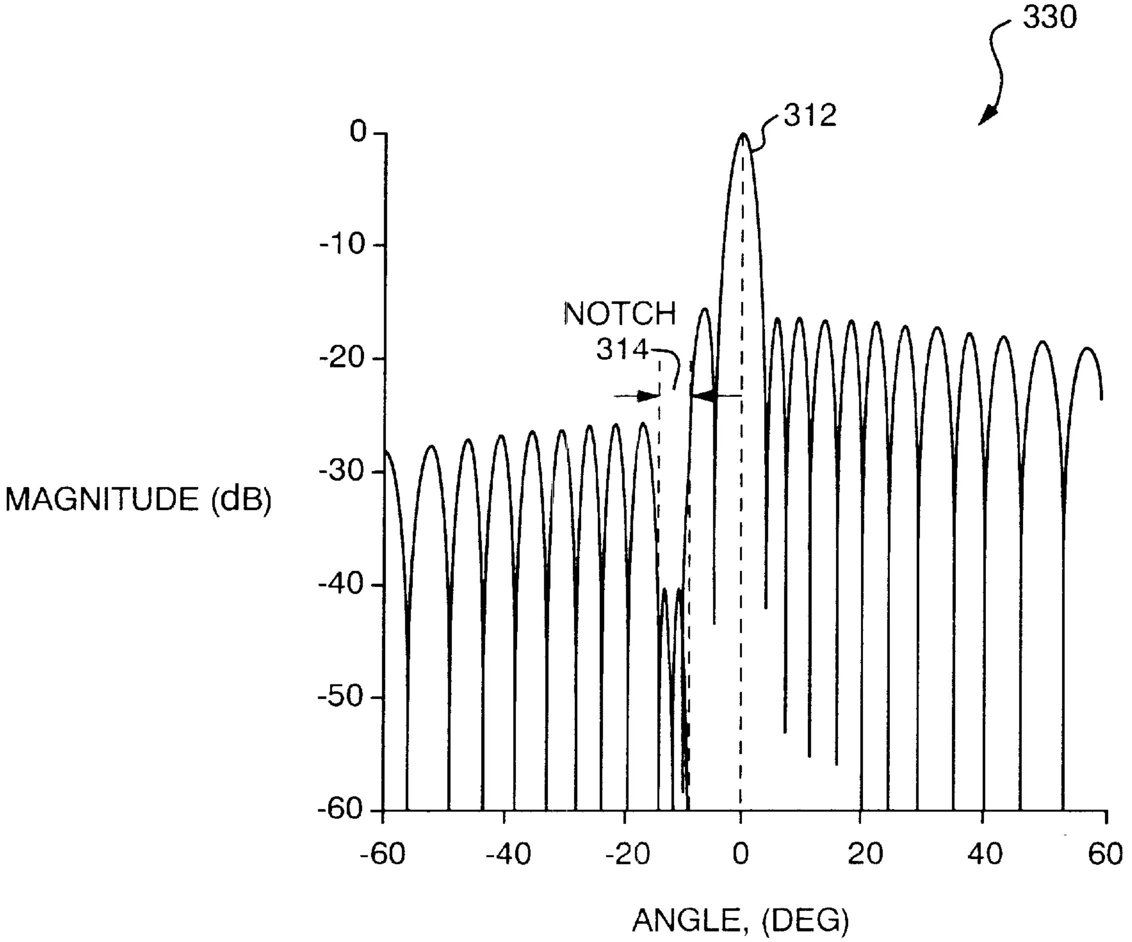
FIGS. 8A–8B are graphical diagrams of a preferred subarray and array radar beam pattern, respectively.
Figure 8B:
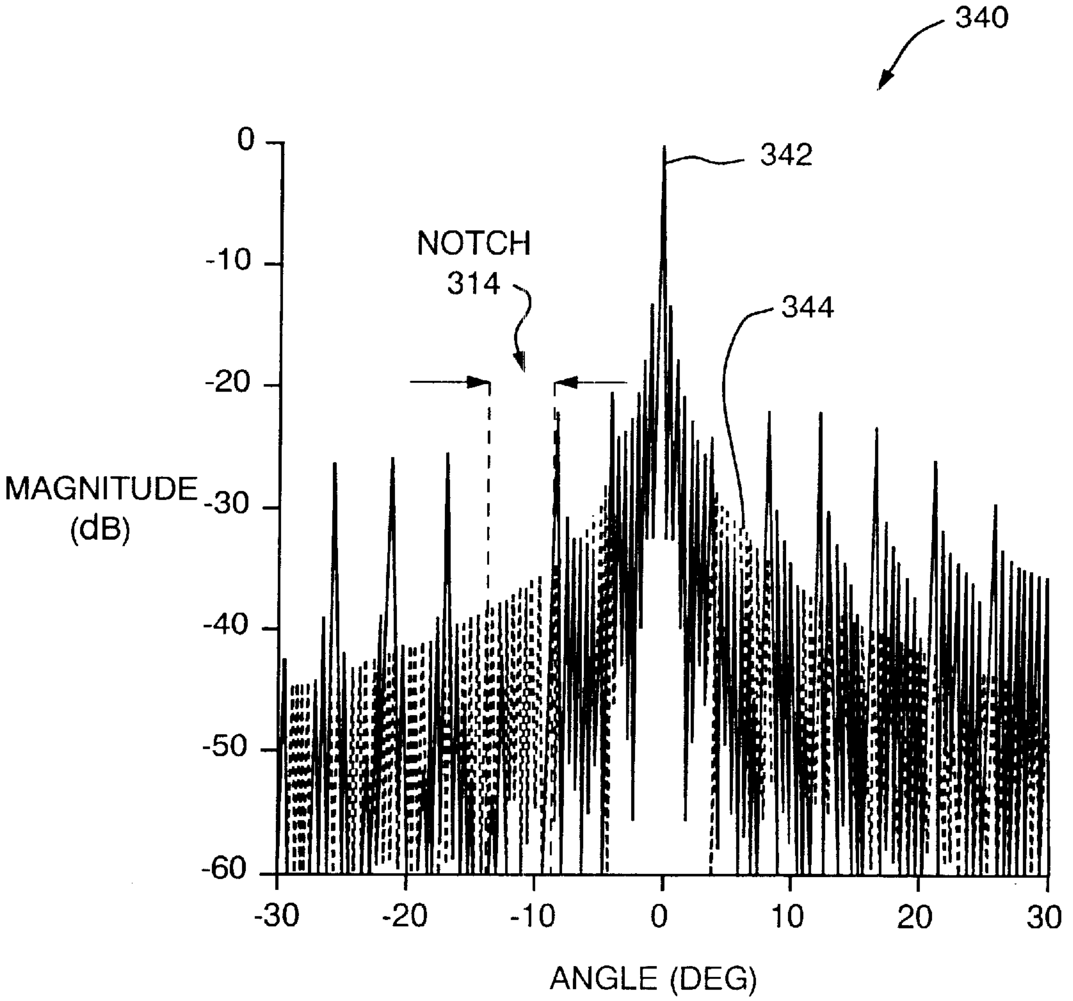

FIGS. 8A–8B are graphical diagrams of a preferred subarray and array radar beam pattern, respectively. As previously mentioned, photonic architectures must not inhibit adaptive beam shaping. Adaptive nulling can be realized for the wavelength division multiplexing architecture with subarray synthesis algorithms. In subarray synthesis, adaptive nulling is obtained by applying element level weightings to a subarray, consistent with notching the desired angular coverage 314 on the subarray pattern, as shown in FIG. 8A. These notching weights are subsequently applied repeatedly to the elements of each subarray in the total array. FIG. 8B shows the resultant notched pattern 342 and un-notched (dashed) 344 pattern of the entire array. Subarray notching is also immune to errors at the subarray level. Therefore, quantization lobes due to subarray TDU errors are totally eliminated in the notch region 314, with fill recovery of notch integrity.

The subarray synthesis predictions are based on an arbitrarily configured linear array of 240 radiating elements spaced on a half wavelength grid. The wavelength division multiplexing architecture was configured for ten subarrays of twenty-four elements per subarray. The array is preferably configured in this manner, as opposed to the minimum TDU configuration, to improve the subarray notching performance. However, the array as preferably configured only requires three more TDUs than the minimum configuration and saves 206 TDUs as compared to the TDU per element architecture. The number of TDUs, however, needs to be traded-off against adaptive beamforming requirements.

Active array radars typically have thousands of active elements, which include integrated optoelectronics and RF components. Calibration techniques serve to minimize manufacturing tolerances and cost on all key components of the phased array system.

Wavelength division multiplexing is an optically non-coherent architecture and therefore, optical fibers need only be trimmed to a fraction of a microwave wavelength as opposed to a coherent architecture which requires fibers to be trimmed to a fraction of an optical wavelength. This dramatically reduces fabrication tolerances and correspondingly, fabrication cost.

The same flexibility which the proposed architecture provides for adaptive beam synthesis also extends to array calibration. Compensation of element level amplitude errors and subarray level time delay errors can be realized with the optical attenuators and subarray TDUs, respectively. Time delay errors which are common to the same element in each of the subarrays can also be corrected with the element level TDUs.

Photonic Devices

A preferred embodiment of the invention includes three photonic devices: 1) a tunable laser source, 2) a broadband amplitude modulator, and 3) a tunable bandpass filter. These devices are applicable to a tactical system, but can also benefit other photonic systems.

There are two approaches to wavelength tuning of an optical source: 1) a laser source with an integrated tunable filter or 2) a laser source employing an external optical frequency modulator. Currently, there are no commercially available tunable lasers with sufficient range to satisfy the requirements of a tactical system employing wavelength division multiplexing, having hundreds of elements per subarray. Preferably, the radar system employs tunable laser, integrating a tunable broadband multiple quantum well (MQW) filter in an intra-cavity format. The development of a single sideband (SSB) optical frequency modulator with inherently high conversion efficiency can also be used. SSB modulators realized in multiple quantum wells produce higher frequency shifts (in the range of 20–70 GHz), are more compact, operate at a lower microwave power level, and obtain higher conversion efficiency than conventional single sideband and multiple sideband phase modulators. Bandpass tunable filters, using enhanced electro-optic Distributed Bragg Reflectors (DBRs) in conjunction with high contrast tunable Fabry-Perot filters, accomplish the wavelength demultiplexing required for the photonic architecture.

A broadband optical amplitude modulator, employing symmetric Fabry-Perot MQW structures is preferred. These electro-refractive modulators offer lower insertion loss than the electro-absorptive devices and a higher RF frequency range of operation as compared to Mach-Zehnder devices.

The above devices are preferably realized using multiple quantum well structures. Enhanced changes in the index of refraction due to nonlinear excitonic effects result from the multiple quantum wells. As an example, Distributed Bragg Reflectors are integrated in a variety of ways to develop tunable lasers and filters. In addition, MQW waveguide structures are utilized to realize single sideband and phase modulators, reducing interaction lengths and resulting in higher RF frequency performance. These structures, which are feasible with MQWs, enhance the optical performance of several key photonic devices. Besides the performance benefits obtained with MQW structures, these devices are fabricated with conventional, well-defined wafer processing techniques. Because hundreds of these devices are fabricated on a single wafer, the realization of inexpensive photonic devices in large quantities is feasible.

A comparison of the expected performance of the preferred and currently available photonic devices is presented below in Table III. The performance of the preferred MQW devices is based on simulations using Stark-effect induced changes in various optical parameter. The University of Connecticut has developed extensive software tools to characterize electrical and optical properties of Multiple Quantum Wells. The programs employ calculations of electron/hole wavefunctions and exciton binding energies. The Stark-effect shifts and associated changes in absorption coefficient and index of refraction are modeled. This specialized suite of software is used to analyze experimentally fabricated high contrast Fabry-Perot modulators, blue-green lasers, optical amplitude modulators and Distributed Bragg Reflectors.

TABLE III

Performance Comparison of proposed and Existing Devices

| Device | Performance Parameters | |
|---|---|---|
| | Prior Art | Preferred Embodiment |
| Frequency Shifter/ Modulator | Linear Electrooptic | MQW |
| Single sideband | Conversion eff. = 40%<br>Freq. Range 8–18 GHz<br>Optical Wavelength 10.6 μm<br>Length 1.6 cm | Conversion eff. h = 60%<br>Freq. Range up to 70 GHz<br>Optical wavelength 1.55 μm<br>Length 40 μm |
| Amplitude Modulator | F–P MQW Asymmetric<br>γ = 860 nm<br>Tuning range < 1.0 nm<br>Frequency 10–40 GHz | F–P MQW Symmetric<br>γ = 1.55 μm<br>Tuning range 5–8 nm<br>Frequency 10–40 GHz |
| Tunable Lasers: | | |
| 1. Reconfigurable DBR Lasers (1.55 μm) | NA | Fine Tuning 0.2–1 nm<br>Coarse Tuning 40–100 nm |
| 2. Integrated Lasers with Filters | Optical wavelength 1.55 μm<br>Power output 1–15 mW<br>Tuning Range 57 nm | Optical wavelength 1.55 mW<br>Power output 1–15 mW<br>Coarse Tuning 40–100 nm<br>Fine Tuning 0.5–2 nm |
| Tunable Filters: | | |
| 1. Fabry-Perot MQW Cavity<br>a. Single Cavity (SC)<br>b. Coupled Cavity (CC) | Contrast 1200:1, tunable<br>Tuning range 8 nm<br>FWHM 0.8 nm (SC)<br>Optical wavelength 980 nm | Contrast > 100:1<br>Fine tuning range 1–2 mn<br>Passband (FWHM) 3 nm<br>Optical wavelength 1.55 μm |

TABLE III-continued

Performance Comparison of proposed and Existing Devices

| Device | Performance Parameters | |
|---|---|---|
| | Prior Art | Preferred Embodiment |
| 2. Induced electrooptic Distributed Bragg Reflector in coupled cavity configuration | NA | Contrast 20:1<br>Tuning range 1–2 nm<br>FWHM 2–3 nm (CC)<br>Optical wavelength 1.55 μm |

Tunable Sources

There are two preferred approaches to tuning the wavelength of an optical source: 1) a laser source with an integrated tunable filter or 2) a laser source employing an external optical frequency modulator. The University of Connecticut has also developed methodologies using multiple quantum well devices to implement both approaches. The development of the tunable laser source is important to the wavelength division multiplexing architecture.

Figure 9:
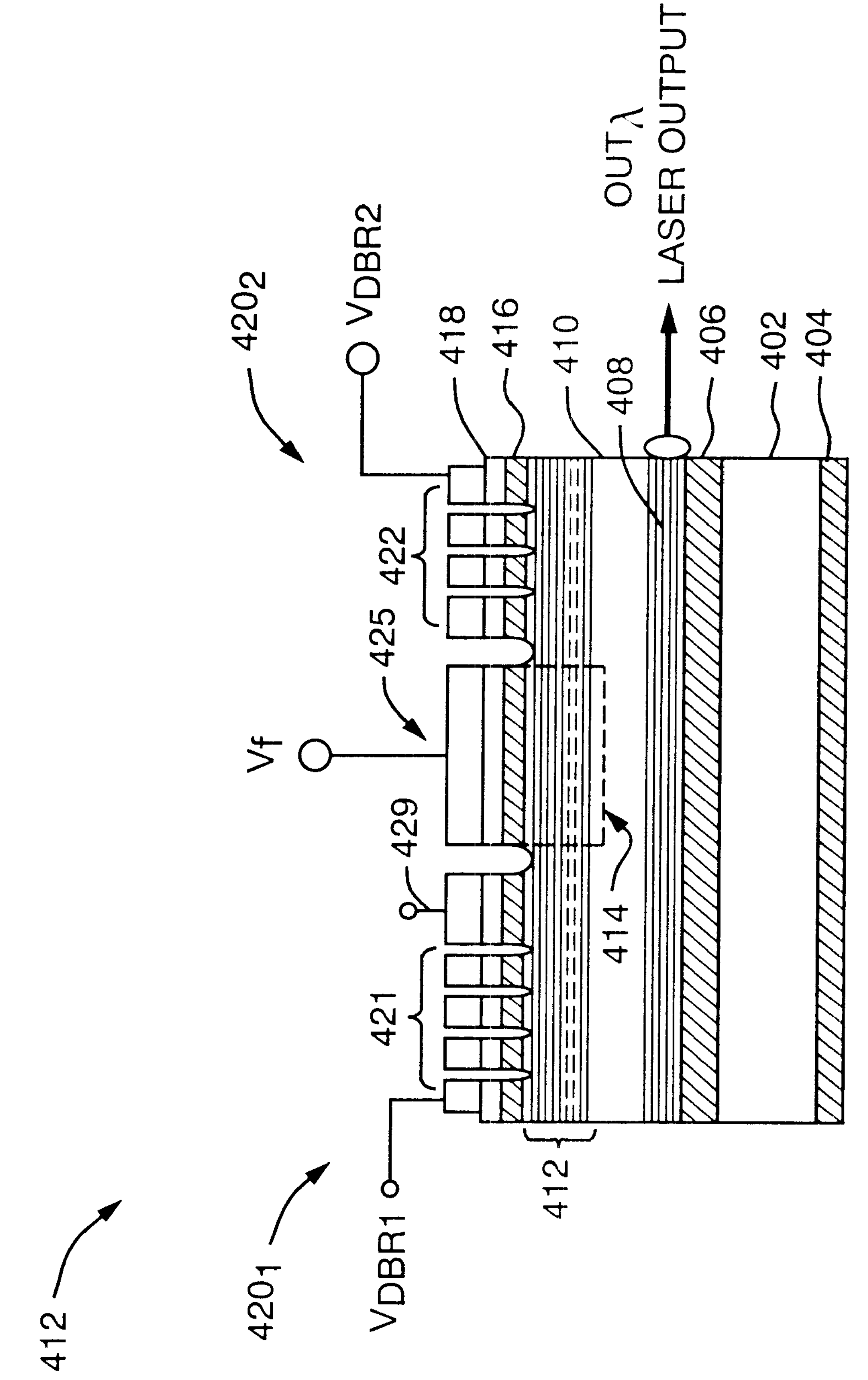
FIG. 9 is a cross-sectional schematic diagram of a tunable multiple quantum well laser having active electro-optic Distributed Bragg Reflectors.

FIG. 9 is a cross-sectional schematic diagram of a tunable multiple quantum well laser having active electro-optic Distributed Bragg Reflectors. In the tunable laser structure 412, feedback is provided by two induced Distributed Bragg Reflectors 420$_1$, 420$_2$. The structure comprises an $n^+$ InP substrate 402 having an ohmic contact 404 on its back side. On the front side of the substrate 402, is a first cladding layer 406 of n-InGaAsP material having a wavelength of 1.3 μm. An active region 408 is formed over the first cladding layer 406 to produce a laser output $OUT_\lambda$. The active region 408 is covered by a second cladding layer 410 of p-InGaAsP material having a wavelength of 1.3 μm.

A layer of undoped MQWs 412 is formed over the second cladding layer 410. The undoped MQWs 412 are formed from 50 angstroms of InGaAsP phosphide wells and 100 angstroms of InGaAsP barriers. The wells have a wavelength of 1.55 μm and the barriers have a wavelength of 1.3 μm. The Stark effect tuning frequency is derived from the wavelength λ, which equals 1.55 μm.

In this structure, a top undoped MQW cladding layer 416, having an effective lower index of refraction than the active layer 408, is selectively doped/implanted with p-type impurities 414 in the gain region 425 of the laser. The DBRs 420$_1$, 420$_2$ are created over the undoped MQWs 412 by producing alternating low and high index regions, via the Stark effect. These DBRs determine the operating wavelength of the laser. Illustrated are the supply voltages $V_{DBR1}$, $V_{DBR2}$ for the DBRs 420$_1$, 420$_2$, respectively. Each DBR also includes a respective set of electrodes 421, 422. Also shown is a tuning cavity 429 and a bias voltage $V_f$ for the gain medium.

Applying an electric field to the DBRs will produce a change in the index of refraction in the range of 0.01–0.05. This effect, which is well understood, is due to the quantum confined Stark effect and results in a re-configuration of the DBRs which results in a shift of the laser wavelength. The doping of the p-type cladding layer adjoining the active layer ensures that there is no electric field in the active layer MQWs due to the biasing of DBRs.

This structure is versatile, as the DBR periods can be adjusted by changing the voltage on the biasing electrodes or by modifying the layout, yielding multiple wavelength operation. To provide additional tuning, a passive cavity adjacent to one of the DBR regions, can be biased to achieve varying optical path length. This laser structure does not require any wafer re-growth.

Figure 10:
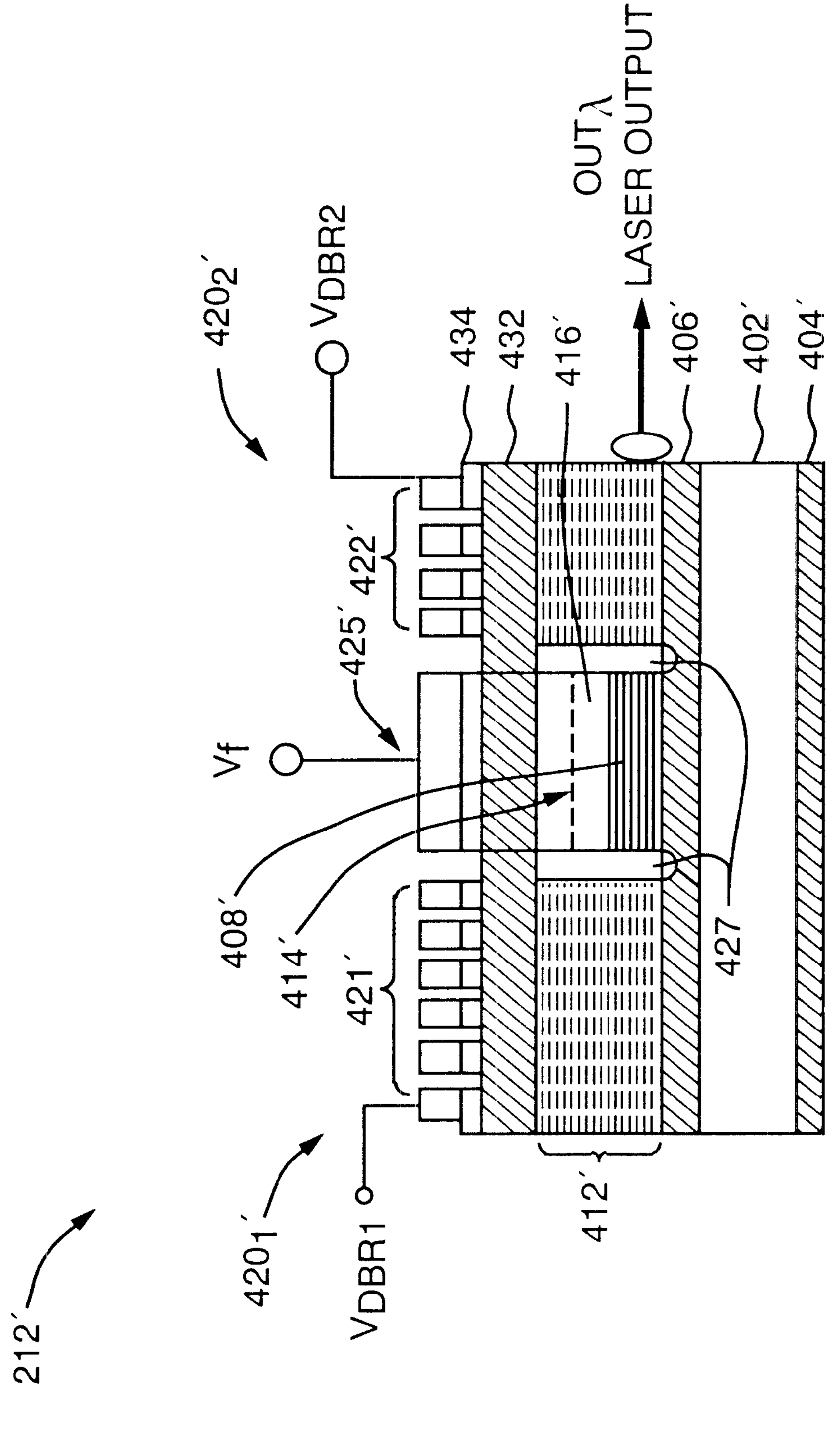
FIG. 10 is a cross-sectional schematic diagram of a tunable laser having electro-optic Distributed Bragg Reflectors formed using regrowth.

FIG. 10 is a cross-sectional schematic diagram of a tunable laser having electro-optic Distributed Bragg Reflectors formed using regrowth. This device is a variation of the device of FIG. 9 and requires selective re-growth of MQW layers. The structure comprises an $n^+$ InP substrate 402' having an ohmic contact 404' on its back side. On the front side of the substrate 402', is a first cladding layer 406' of n-InGaAsP material having a wavelength of 1.3 μm. An active region 408' is formed over the first cladding layer 406' to produce a laser output $OUT_\lambda$. The active region 408' is covered by a second cladding layer 416' of p-InGaAsP material having a wavelength of 1.3 μm.

A laser gain region 425' is sandwiched between two DBR's $420_1$', $420_2$'. For each DBR, a layer of undoped MQWs 412' is formed over the first cladding layer 406'. The undoped MQWs 412' are formed from 50 angstroms of InGaAsP phosphide wells and 100 angstroms of InGaAsP barriers. The wells have a wavelength of 1.55 μm and the barriers have a wavelength of 1.3 μm. The Stark effect tuning frequency is derived from the wavelength λ, which equals 1.55 μm. The laser gain 425' and the DBR $420_1$', $420_2$' regions are isolated via semi-insulating implants 427. Configuring the device in this fashion results in increased index of refraction changes in the DBR region, as compared to the no re-growth structure, for a given applied voltage. The higher index changes result in higher finesse/tuning and a purer spectrum.

In this structure, a top undoped MQW cladding layer 416', having an effective lower index of refraction than the active layer 408', is selectively doped/implanted with p-type impurities 414' in the gain region 425' of the laser. The DBRs $420'_1$, $420'_2$ are created over the undoped MQWs 412' by forming a thick layer of undoped InGaAsP 432 with a wavelength of 1.3 μm as shown. These DBRs determine the operating wavelength of the laser. Illustrated are the supply voltages $V'_{DBR1}$, $V'_{DBR2}$ for the DBRs $420'_1$, $420'_2$, respectively. Each DBR also includes a respective set of electrodes 421', 422' formed over a cap of undoped InP 434. Also shown is a bias voltage $V'_f$ for the gain medium.

Figure 11:
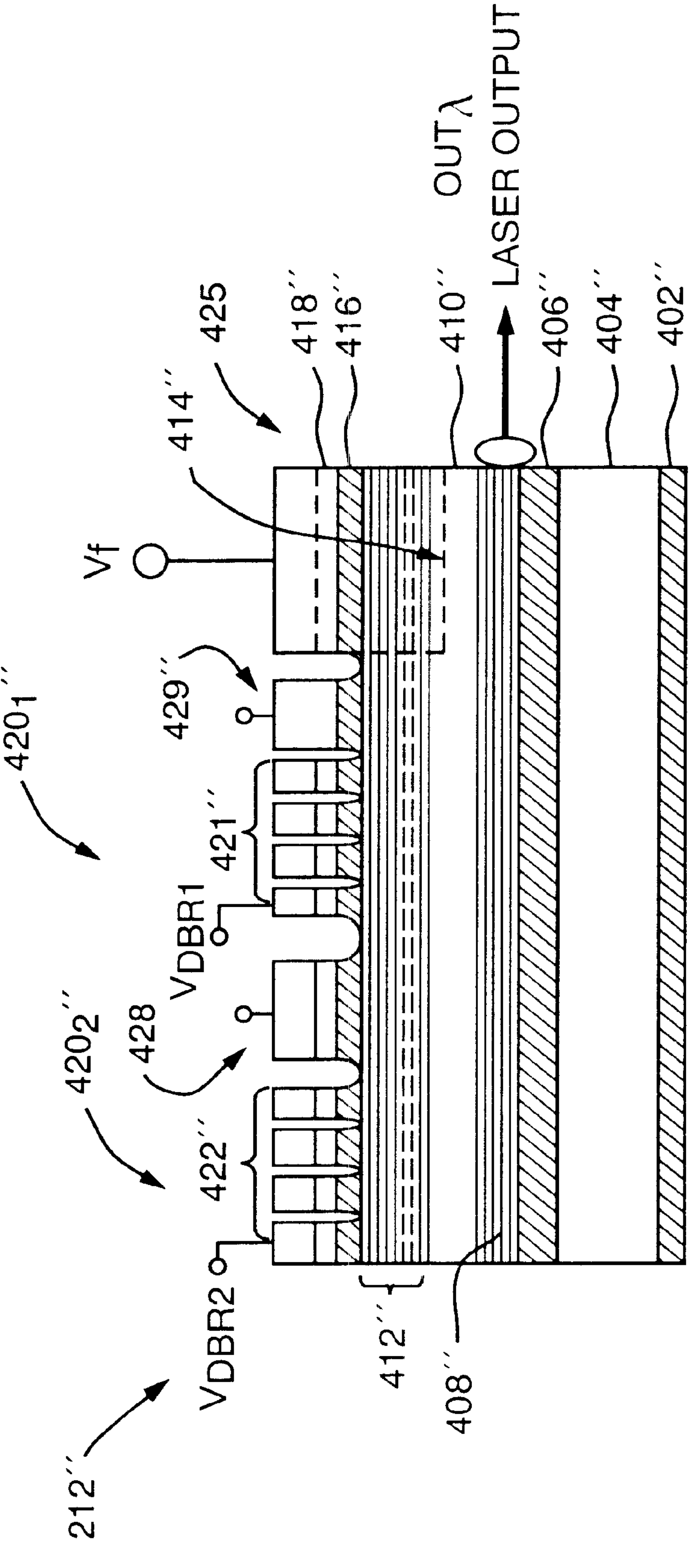
FIG. 11 is a cross-sectional schematic diagram of a Fabry Perot laser structure.

FIG. 11 is a cross-sectional schematic diagram of a Fabry-Perot laser structure. As illustrated, a laser gain region 425" is integrated with a broadband filter 428. The broadband filter comprises electro-optic DBRs and a passive cavity. This laser, which has been analyzed as a coupled-cavity device, manifests a broader tuning range for a given DBR electrode configuration than the tunable laser mentioned above.

The structure comprises an $n^+$ InP substrate 402" having an ohmic contact 404" on its back side. On the front side of the substrate 402", is a first cladding layer 406" of n-InGaAsP material having a wavelength of 1.3 μm. An active region 408" is formed over the first cladding layer 406" to produce a laser output $OUT_\lambda$. The active region 408" is covered by a second cladding layer 410" of p-InGaAsP material having a wavelength of 1.3 μm.

A layer of undoped MQWs 412" is formed over the second cladding layer 410". The undoped MQWs 412" are formed from 50 angstroms of InGaAsP phosphide wells and 100 angstroms of InGaAsP barriers. The wells have a wavelength of 1.55 μm and the barriers have a wavelength of 1.3 μm. The Stark effect tuning frequency is derived from the wavelength λ, which equals 1.55 μm.

In this structure, a top undoped MQW cladding layer 416", having an effective lower index of refraction than the active layer 408", and an p-InP cap layer 418" are selectively doped/implanted with p-type impurities 414" in the gain region 425" of the laser. The DBRs $420"_1$, $420"_2$ are created over the undoped MQWs 412 by producing low-high index regions, via the Stark effect. These DBRs determine the operating wavelength of the laser. Illustrated are the supply voltages $V"_{DBR1}$, $V"_{DBR2}$ for the DBRs $420"_1$, $420"_2$, respectively. Each DBR also includes a respective set of electrodes 421", 422". Also shown is a filter cavity 428, a tuning cavity 429", and a bias voltage $V"_f$ for the gain medium.

Several approaches can be employed to produce optical carrier frequencies which are shifted from the laser source frequency. A commonly used technique is to employ phase modulators where the frequency offset is equal to the modulating microwave signal. Phase modulators employing linear electro-optic effect in bulk/epitaxial material, as well as enhanced electro-optic effects in MQWs, are known. These phase modulators are relatively simple in construction, and offer frequency shifting in the 10–50 GHz range. However, the optical signal loss through these devices is unacceptably high, due to the low conversion efficiency. Conversion efficiency is defined as the ratio of the power of the frequency shifted optical signal to the power of the input optical signal.

To overcome this problem, a traveling wave single sideband MQW modulator can be used. Unlike double sideband modulators, 100% conversion of the optical power is theoretically possible in single sideband modulators. A single sideband is produced when a circularly polarized microwave field interacts in an electro-optic medium with a circularly polarized optical field. A device of this nature can be implemented in a multiple quantum well (MQW) configuration instead of the conventional linear electro-optic effect configuration. Due to enhanced birefringence in the waveguide region, MQW single sideband modulators offer significantly higher frequency modulation as compared to the conventional SSB configuration. A single sideband modulator using linear electro-optic effects can be fabricated in GaAs. The relatively weak electro-optic effect ($Dn/n \sim 7 \times 10^{-5}$) in AlGaAs/GaAs required a 1.6 cm long waveguide to get a significant conversion (e.g., 40%). The long waveguide result in a very limited frequency range of 8–18 GHz, and an excessive drive voltage of 230 volts.

Figure 12:
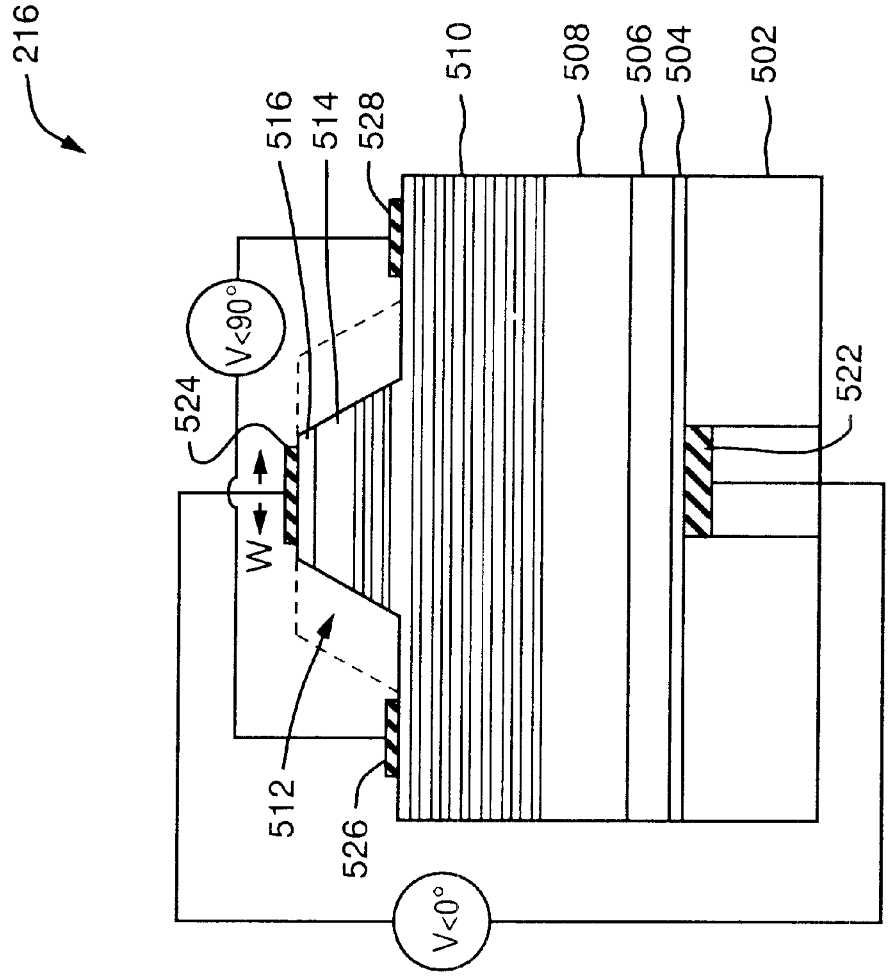
FIG. 12 is a cross-sectional schematic diagram of a single sideband modulator employing a multiple quantum well waveguide.

FIG. 12 is a cross-sectional schematic diagram of a single sideband modulator employing a multiple quantum well waveguide. The modulator preferably operates at 1.55 μm. Because the change in the index of refraction is of the order of 0.01–0.03 with applied electric field, the required device length is approximately 40 μm. The SSB multiple quantum well modulator consists of an optical waveguide which is shaped to propagate a circularly polarized (CP) optical field.

The device is formed on an InP substrate 502. An etch stop 504 is formed over the substrate 502. The structure is processed to form an InP buffer layer 506 over the etch stop 504. A first InGaAsP (1.3 μm) cladding layer 508 is then formed over the buffer 506. An undoped MQW 510 having an InGaAsP (1.5 μm) well and an InGaAsP (1.3 μm) barrier is formed over the first cladding layer 508. A second InGaAsP (1.3 μm) cladding layer 514 is formed over the MQW 510 as shown. Undoped InP 512 is regrown over the second cladding layer 514 and etched to form an InP cap 516.

Stripline contacts 524, 526, 528 are then deposited on the structure. The structure is also backside processed, etching a region of the substrate 502 to the stop 504. A ground contact is formed under the etch stop 504.

The circularly polarized microwave field is excited by placing striplines 524, 526, 528 and ground electrodes 522 as depicted. The proximity of striplines, 8 μm, as compared to linear electro-optic bulk GaAs SSB modulator, 48 μm, requires a significantly smaller drive voltage. The reduced stripline length and width leads to at least an order of magnitude reduction of the device capacitance, providing operation up to 70 GHz. The upper frequency of the device is limited by the response time of the excitions, which has been shown to be approximately 1 ps.

Bandpass/Tunable Filters

Multiple quantum well tunable filters are preferred for the optical filtering required by the wavelength division multiplexing architecture. The transmission spectrum of the filter is such that is selects a particular passband around a wavelength λl to which it is tuned. Surface normal and waveguide configured MQW filters satisfy this requirement.

Figure 13:
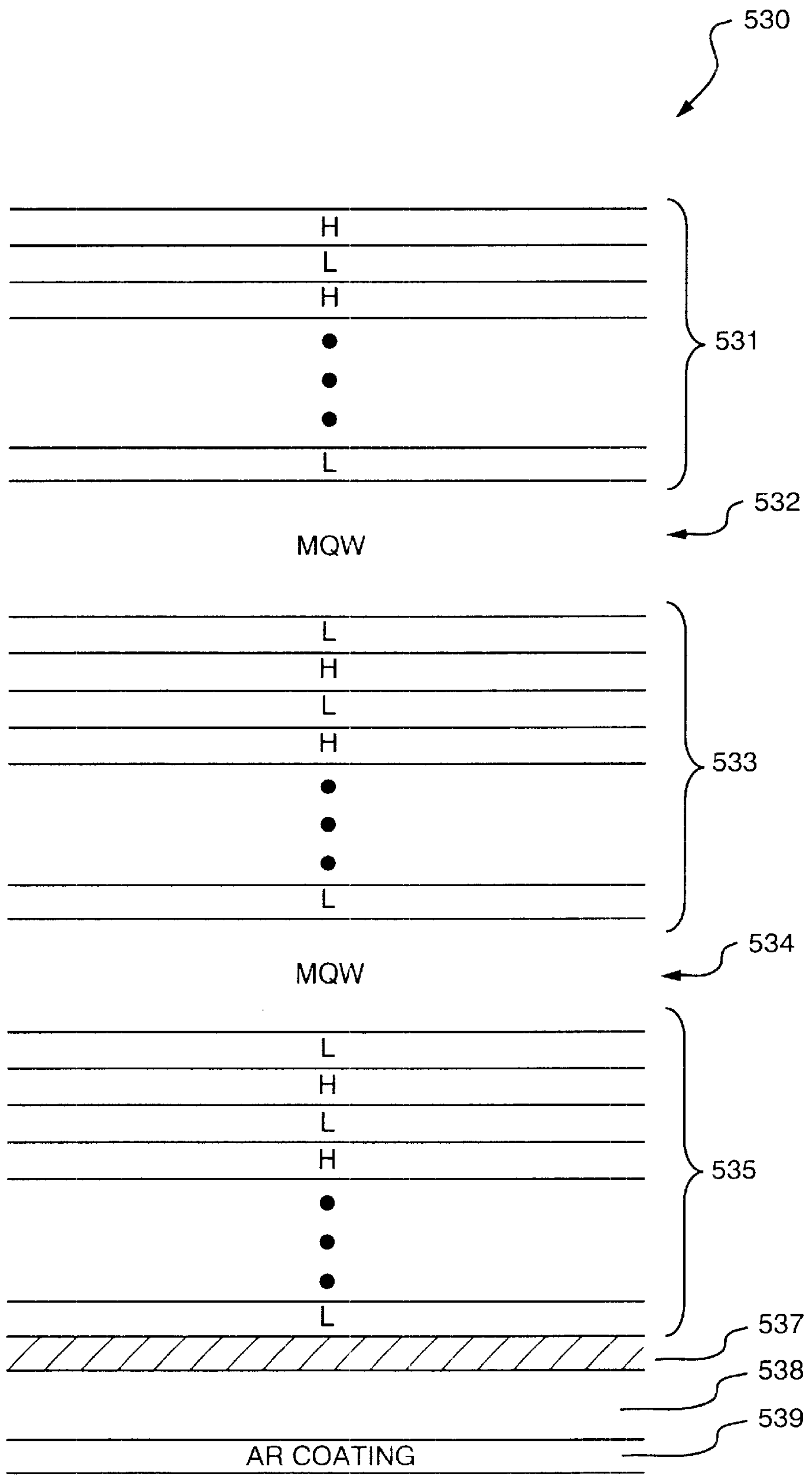
FIG. 13 is a schematic configuration of a preferred bandpass filter in the surface normal configuration consisting of two coupled multiple quantum well cavities.

FIG. 13 is a schematic diagram of a preferred bandpass filter in a surface normal configuration. The filter 530 includes two coupled MQW cavities 532, 534, each sandwiched between a pair of dielectric quarter wave mirrors. The mirrors are formed from alternating layers of InGaAsP (1.3 μm) and InP. The filter is formed over a InP buffer layer 537 on a n-InP substrate 538. An antireflective coating 539 is formed on the backside of the substrate 538.

Figure 14:
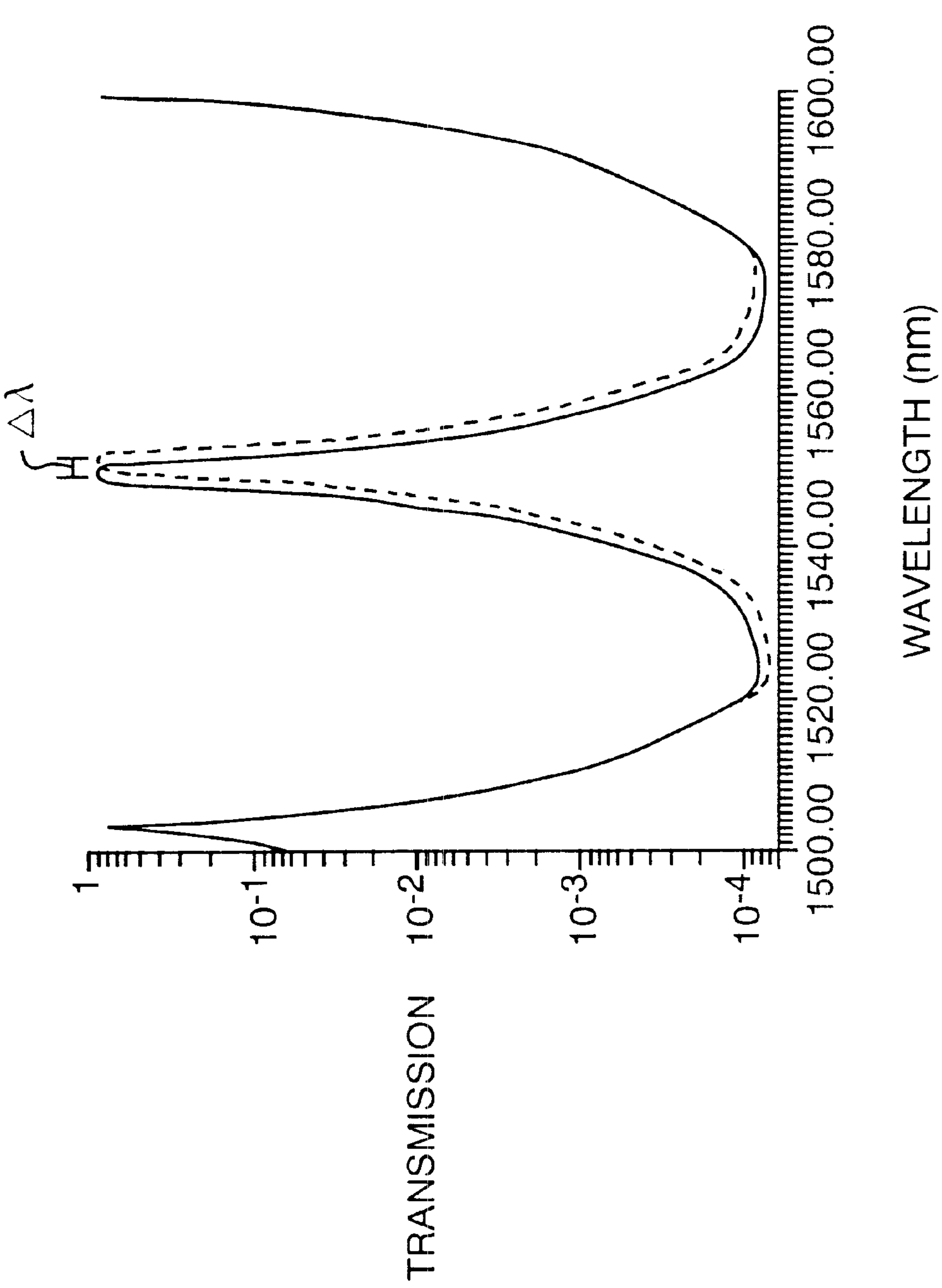
FIG. 14 is a graphical diagram of the spectral characteristics of the filter of FIG. 13.

FIG. 14 is a graphical diagram of the spectral characteristics of the filter of FIG. 13. This figure shows the passband characteristics of the device obtained by adjusting the mirror periods and cavity lengths. The performance of the structure shows a passband full width at half maximum, FWHM, of about 3 nm. In addition, the passband of the filter can be shifted (Δλ) by changing the index (Δn=0.01) with an external voltage across the MQW cavities. The width of the passband can also be reduced, if necessary, to accommodate a larger number of adjacent laser wavelength bands.

Figure 15:
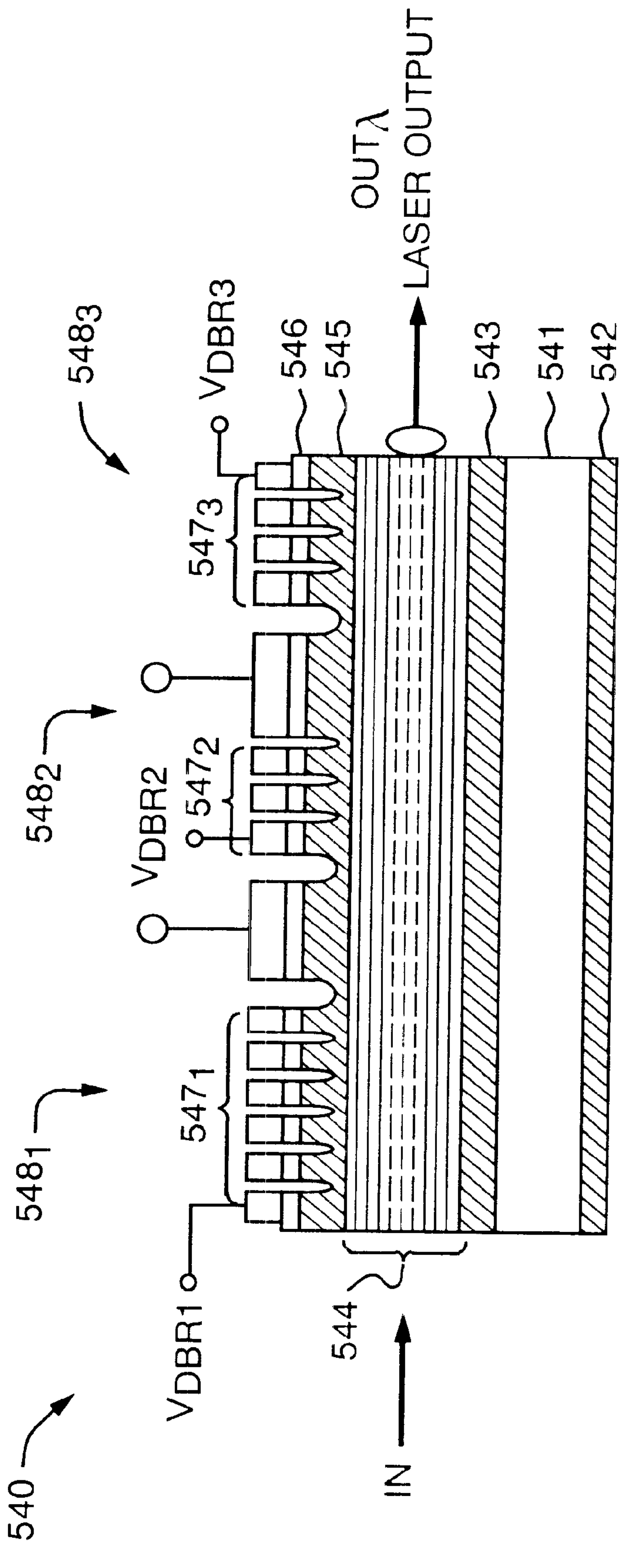
FIG. 15 is a schematic cross-section of a preferred coupled cavity filter having a tunable passband waveguide type multiple quantum well device.

FIG. 15 is a schematic cross-section of a preferred coupled cavity filter having a tunable passband waveguide type multiple quantum well device. The structure 540 is formed on an $n^+$ InP substrate 541 having an ohmic contact 542 on its backside and a first cladding layer 543 of n-InGaAsP (1.3 μm) on its front side. Undoped MQWs 544 are formed over the first cladding layer 543. The MQWs 544 are covered with a second cladding layer 545 of InGaAsP (1.3 μm), which are capped with a layer of InP 546. The cap 546 and second cladding layer 545 are etched and metallized to form contacts. The contacts include voltage $V_{DBR1}$, $V_{DBR2}$, $V_{DBR3}$ and electrodes 547$_1$, 547$_2$, 547$_3$ for three DBRs. Cavity bias voltages are provided through two contacts $V_{b1}$, $V_{b2}$. A light input IN to the MQW waveguide laser output $OUT_\lambda$ are provided as shown.

Light is coupled into the MQW optical guide at one end of the device using an appropriate coupling scheme. The structure includes distributed quarter-wave Bragg reflectors which sandwich two multiple quantum well cavities. The DBRs are realized by conventional regrowth or by inducing periodic index changes in the MQW layers using Schottky electrodes.

The inter-electrode spacing is designed to yield an odd multiple of a quarter wavelength separation between low and high index regions. The electric field under the electrodes, ranging between $1\times10^4$ to $10\times10^4$ V/cm, produces a change in the index using the quantum confined Stark effect (QCSE). The index change is in the range of 0.01 to 0.05. The QCSE induced DBRs 548$_1$, 548$_2$, 548$_3$ form the mirrors for the MQW cavities. These cavities can also be tuned using the Stark effect.

The Fabry-Perot structure thus realized has tunable DBRs as well as a tunable cavity and is therefore, a very versatile system. The pitch of the DBR electrodes can also be modified to change the passband of the filter. These filters are designed in the wavelength region matching the lasers described above.

Non-Dispersive Time Delay Unit

Two technologies are preferably melded together for the non-dispersive Time Delay Unit (TDU) with a range of applicability to broadband radars. The first technology is liquid crystal based optical phased arrays for high-precision pointing and tracking. This technology allows for electronic control of the phase of light propagating through a thin, flat optical element by applying various voltages to selected electrodes. This affects the orientation and thus optical phase shift of an overlying liquid crystal film. The second technology is photolithographically definable low-loss waveguides on Si wafers. These waveguides can incorporate optical gain, if desired, by including doped glass for optically-pumped lasers. The fabrication technology is quite flexible regarding geometry and material but has not allowed electro-optical effects because the waveguide materials, which can be deposited by the pyrolysis technology, are amorphous glasses.

The lack of any electro-optical control interaction except for thermal (variation of index with temperature, which requires significant power dissipation and is slow) has previously been a serious limitation in the application of these waveguides. By adding a liquid crystal layer in the evanescent-wave region of the upper waveguide cladding and including appropriate control electrodes within the structure, low-power, reasonably fast electrical controllability has been added to these waveguides. A key to making a low-cost, low-loss TDU is to integrate several Mach-Zehnder interferometer-based switches and various binary-weighted delay lines into a single device.

By making the guides of deposited dielectrics on Si, all of the time delays can be packaged on a single three-inch wafer. For the longest delay bits, an off-wafer fiber may be used if the waveguide loss is deemed excessive. Several hundred degrees of phase shift per millimeter of interaction length can be obtained in such modulators with only a few volts. Each crossbar switch incorporates a 4-port Mach-Zehnder Modulator (MZM), which incorporates a region of waveguide with the upper cladding removed or thinned to allow liquid crystal to interact with the propagating light waves. Alignment layers deposited on the wafer aligns the liquid crystal in a low-index state. Electrodes parallel to the waveguides over a short interaction region, a few tens of μm long, allow switching of the liquid crystal to a higher-index orientation. This produces the needed phase shift to switch the 4-port between the cross to the bar states. The large index change exhibited by liquid crystals, which is in excess of 0.1, keeps the overall MZM length short enough so that active bias control may be eliminated.

In another preferred embodiment of the TDU, the control signals for the switches are fed as digital modulation on the very lightwave which passes through the TDU. These combined digital/microwave signals, when received by a GaAs integrated circuit mounted directly on the TDU as the end of the waveguide, are split, and the digital part used to control the switches via metal traces integrated directly on the TDU wafer. Thus the microwave signal received by the integrated circuit will already have been time delay as commanded. Binary TDUs can also be implemented with various lengths of fiber and commercially available optical switches.

Non-coherent Reactive Combiner

A difficulty in combining at light frequencies in constrained fiber optic distribution architectures is that different links do not maintain coherence among themselves. Even if a single laser is used, the fiber path lengths cannot be maintained within a fraction of the optical wavelength. As a result, optical combiners experience very high losses: if Q links are combined, the RF loss is 20*log(Q). In many applications such a loss is not tolerable. Furthermore, variations of the relative path length caused by temperature and vibration can drastically modulate the detected signals as the lightwave drifts in and out of phase.

A preferred embodiment of the invention employs a four channel (preferably 0.7 inch by 0.7 inch, for example) non-coherent reactive combiner. An array of photodiodes share a common cathode and anode, so RF currents produced at each photodiode are combined in an output port. The photodiode array then serves to demodulate the links and as a reactive RF combiner, recovering the coherent sum of the RF signals. The optical inputs do not need to be coherent light frequencies because the photodiodes are power detection devices. A single chip can now replace bulky RF combiners, suffering no loss other than normally associated with removing a microwave signal from an optical carrier.

A preferred MSM photodetector includes interdigitated back-to-back Schottky diodes resulting in low capacitance and higher operational frequencies. The low frequency noise of a MSM photodetector is rather high, but for radar frequencies, the noise power spectrum is dominated by the quantum limited noise. The fabrication of the device lends itself to integration with main stream MESFET/HEMTIC processing technology. The structure and fabrication of the MSM photodetectors also makes feasible the integration of a photodetector array, or non-coherent combiner, on a single substrate.

Figure 16A:
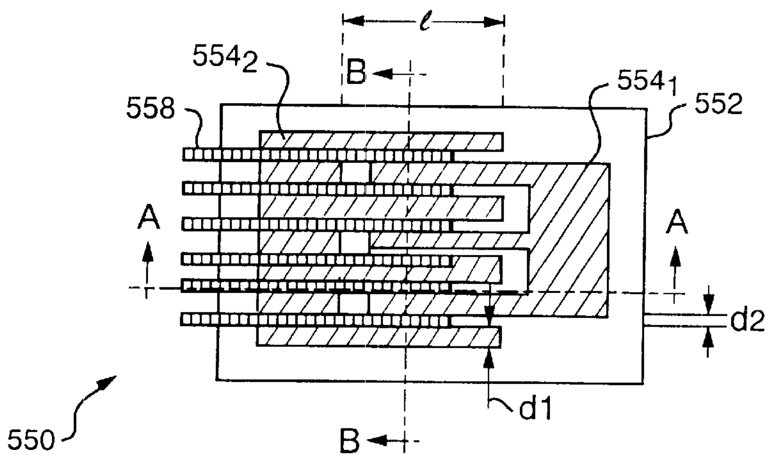
FIGS. 16A–16C are schematic diagrams of a preferred metal-semiconductor-metal photodetector array.
Figure 16B:
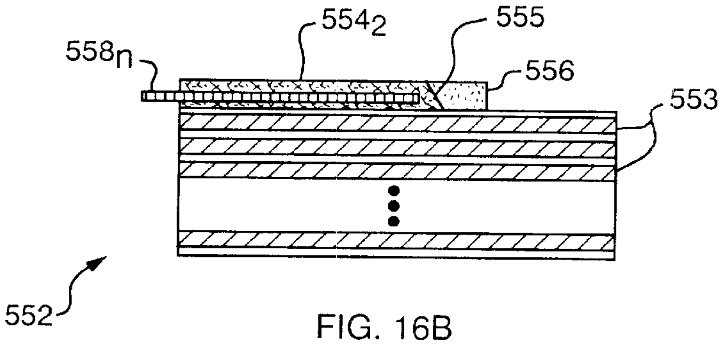
Figure 16C:
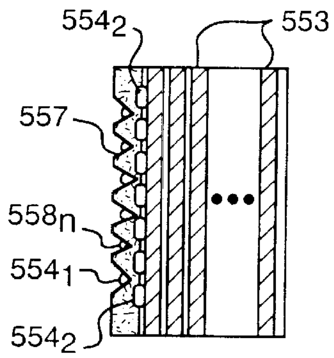

FIGS. 16A–16C are schematic diagrams of a preferred metal-semiconductor-metal photodetector array. Long-wavelength (1.3 to 1.5 $\mu$m) InGaAs MSM photodetectors are preferably fabricated from MOCVD material. These devices are fabricated with contact photolithography, rather than E-beam, resulting in line and space widths of 1.5 $\mu$m. Bandwidths of these devices, which incorporated a 0.7 $\mu$m thick lattice-matched InGaAs absorption layer on an InP wafer, are in excess of 10 GHz.

FIG. 16A is a top view of a preferred metal-semiconductor-metal photodetector array 550. Illustrated is a photodetector structure 552. A set of cathode electrodes $\mathbf{554}_1$ and a set of anode electrodes $\mathbf{554}_2$ are formed over the photodetector structure 552. As illustrated the electrodes have a width d1 and are separated by a distance d2. The electrodes have a length l. Also illustrated are fiber optic cables 558 which provide optical signals to the photodetector array 550.

FIG. 16B is a side cross-sectional view of the photodetector array 550 taken along line A—A of FIG. 16A. Illustrated is an optical cable $\mathbf{558}_n$ extending along an electrode $\mathbf{554}_2$. Light from the fiber optic cable $\mathbf{558}_n$ is reflected into the photodetector structure 552 by a reflective surface 555 of a terminator 558. As shown, the photodetector structure 552 includes a plurality of thin epitaxial absorption layers 553.

FIG. 16C is an end cross-sectional view of the photodetector array 550 taken along line B—B of FIG. 16A. The electrodes 554 are fabricated and the fiber optic cables 558 are positioned between anode and cathode electrodes. The cables 558 are supported by a micro-machined silicon structure 557.

Figure 17:
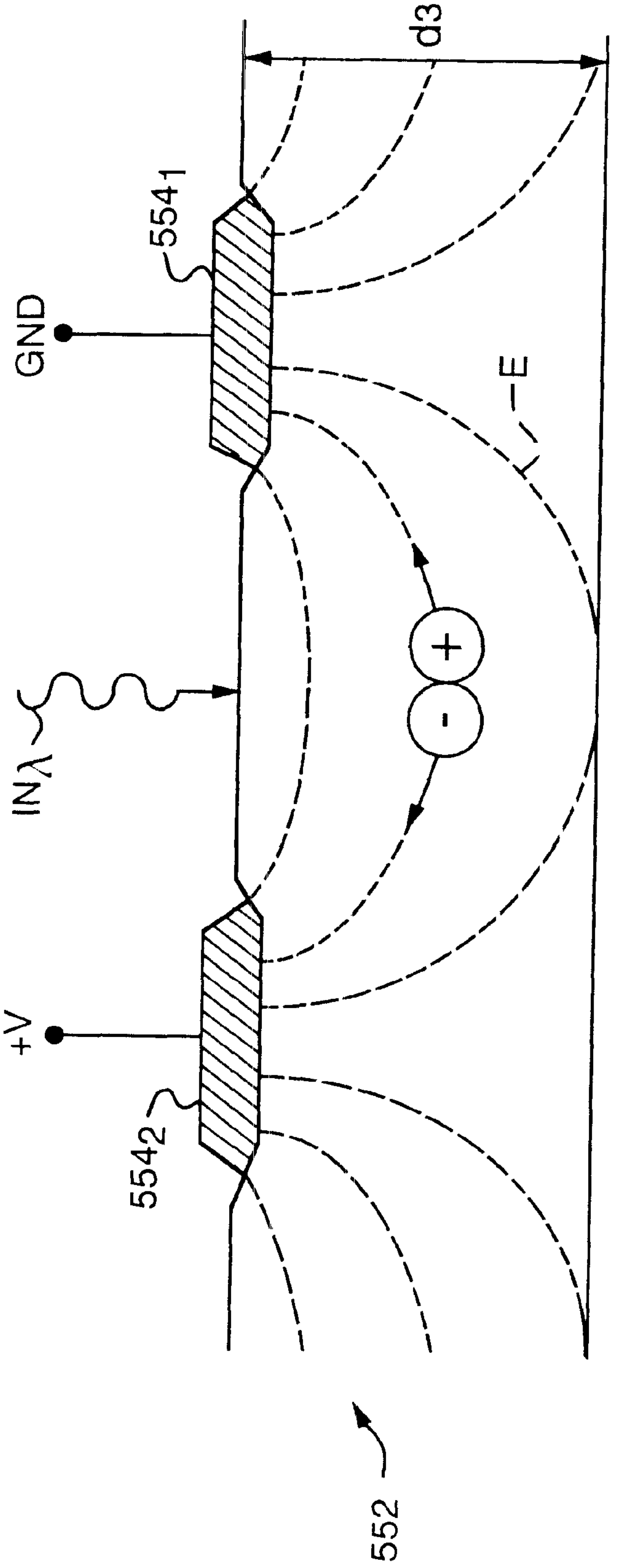
FIG. 17 is a cross-sectional schematic diagram of an electric field pattern between electrodes of FIGS. 16A–16C.

FIG. 17 is a cross-sectional schematic diagram of an electric field pattern between electrodes of FIGS. 16A–16C. Illustrated are an anode $\mathbf{554}_2$, a cathode $\mathbf{554}_1$ and an absorption layer 552 having a thickness d3. The electrodes form electric field lines E into the pattern shown. Light $IN_{80}$ is received by the structure between the electrodes as illustrated.

Optical Amplitude Modulators

Although amplitude modulation can be achieved using Mach-Zehnder type devices on LiNbO3 or InP substrates with frequency limits of 18–20 GHz, a high contrast, tunable Fabry-Perot MQW cavity, implemented as an optical modulator offers a significantly higher frequency range of operation. The Fabry-Perot modulators obtain a higher frequency range as they do not require the large interaction length which results in higher capacitance. The high contrast provides a larger dynamic range, which can be adjusted by an external bias. The transmittance, or reflectance, of a Fabry-Perot device operating in the Stark effect regime can be modulated with an external electrical signal.

An electro-absorptive asymmetric Fabry-Perot MQW structure can operate at 20 GHz. Electro-refractive F-P modulators offer lower insertion loss than electro-absorptive devices. They are compact in size and relatively easy to integrate. The University of Connecticut has realized these devices at 980 nm.

Normal incidence asymmetric Fabry-Perot optical device utilizing back mirror reflectivity modulators, however, exhibit large electroabsorption and can incur losses of approximately 60 dB when operated at 37 GHz. When operated sufficiently detuned from the excitonic electroabsorption peak, electrorefractive Fabry-Perot modulators which utilize RF-induced mode shifting can offer lower insertion losses than electroabsorptive devices. They also require shorter interaction lengths than Mach-Zehnder devices and can therefore operate at high frequencies. A preferred structure is similar to a tunable filter, as described above.

Figure 18:
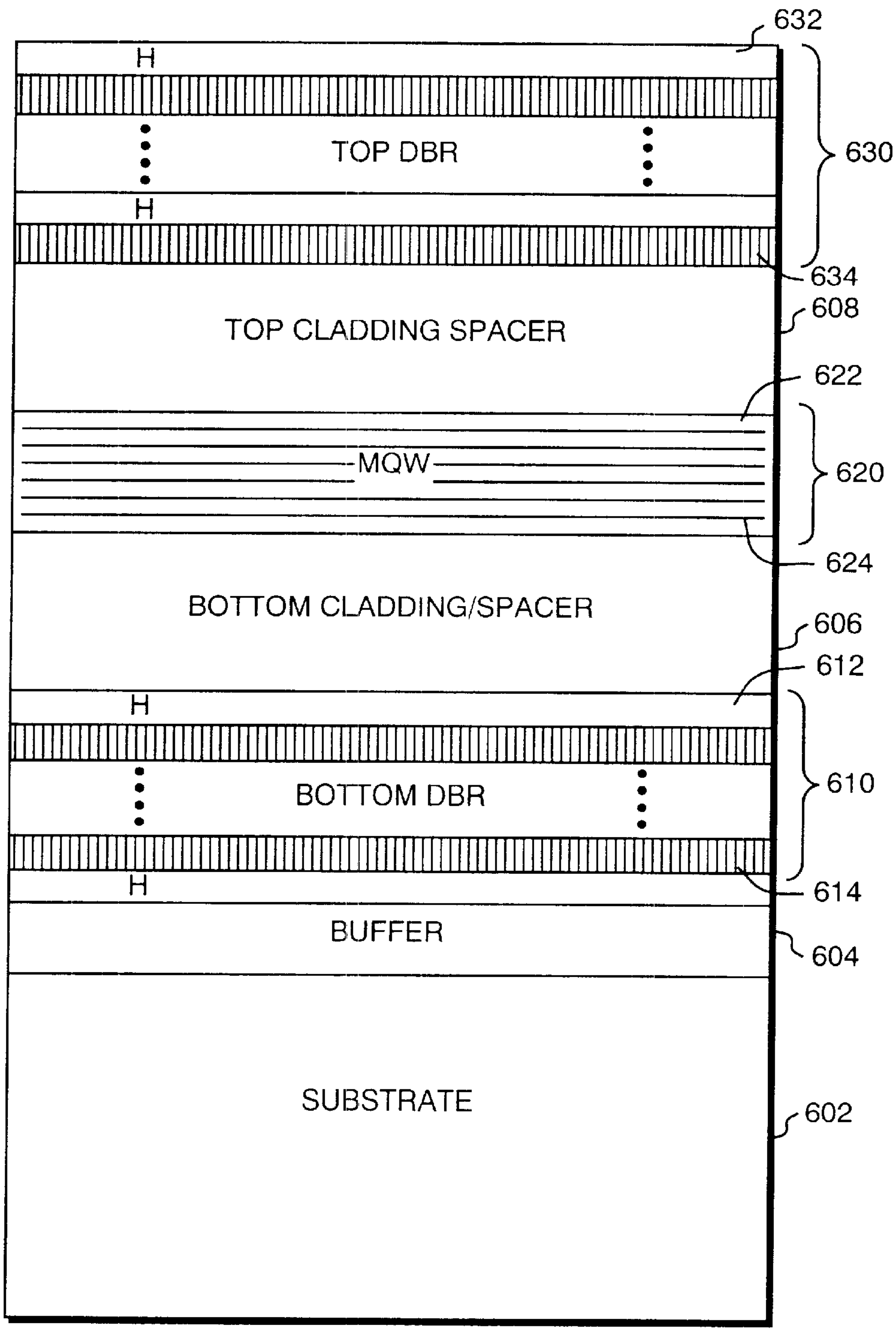
FIG. 18 is a cross-sectional schematic diagram of an optical amplitude modulator employing symmetric multiple quantum well cavity Fabry-Perot structure.

FIG. 18 is a cross-sectional schematic diagram of an optical amplitude modulator employing symmetric multiple quantum well cavity Fabry-Perot structure. The structure 600 is formed over an n-type InP substrate 602 with an InP buffer layer 604. A bottom DBR 610 having 14.5 periods of n-type InGaAsP (1.532 $\mu$m) 612 and InP 614 layers is formed over the buffer layer 604. The bottom DBR 610 is covered by a bottom cladding layer 606 of n-type InP which spaces the bottom DBR 610 from an undoped MQW cavity 620. The MQW cavity 620 is formed from 62 periods of InGaAsP (1.532 $\mu$m) wells 622 and InGaAsP (1.3 $\mu$m) barriers 624. The MQW cavity 620 is covered by a top cladding layer 608 of p-type or undoped InP, which spaces the MQW cavity 620 from a p-type or undoped top DBR 630. The top DBR 630 is fabricated from 9 periods of InGaAsP (1.532 $\mu$m) 632 and InP 634.

The preferred structure 600 can be fabricated to operate with various selected device capacitances and upper RF modulation frequencies by varying the size of the active area and the MQW layer thickness. This leads to a trade-off between applied voltage swing and the upper frequency limit of the modulator.

A preferred Fabry-Perot electro-refraction MQW modulator offers many advantages, including bandwidths, dynamic range, optical loss and size, as compared to currently available devices. The reduced interaction region and device size also lend themselves to the ruggedization of this broadband modulator for tactical applications.

Equivalents

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A circuit for combining optically-carried signals comprising:

a plurality of optical inputs, each optical input carrying an optical signal modulated by a respective radio frequency signal associated with an antenna element in a phased array radar system; and a plurality of photodetectors, each photodetector coupled to a respective optical input and producing a current relative to the modulating radio frequency signal, the produced current from each photodetector being combined to yield a total current.

2. The circuit of claim 1 further comprising a phase shifter introducing a phase shift in a select plurality of the produced currents.

3. The circuit of claim 1 wherein the photodetectors are fabricated on a common substrate.

4. The circuit of claim 3 further comprising a micro-machined layer of semiconductor material for positioning the optical inputs relative to the respective photodetectors.

5. The circuit of claim 1 wherein the optical signals are non-coherent.

6. The circuit of claim 1 wherein the photodetectors are Metal-Semiconductor-Metal devices.

7. The circuit of claim 1 wherein there are a plurality of optical signals, each having a unique wavelength.

8. The circuit of claim 7 wherein each optical signal is provided at a plurality of optical inputs.

9. A method of combining optically-carried signals comprising:

for each of a plurality of optical inputs, modulating an optical signal by a respective radio frequency signal associated with an antenna element in a phased array radar system;

for each of a plurality of photodetectors, receiving a respective modulated optical signal and producing a current relative to the modulating radio frequency signal; and combining the produced current from each photodetector to yield a total current.

10. The method of claim 9 further comprising introducing a phase shift in a select plurality of the produced currents.

11. The method of claim 9 wherein the plurality of photodetectors are fabricated on a common substrate.

12. The method of claim 11 further comprising positioning the optical inputs relative to the respective photodetectors using a micro-machined layer of semiconductor material.

13. The method of claim 9 wherein the optical signals are non-coherent.

14. The method of claim 9 wherein the plurality of photodetectors are Metal-Semiconductor-Metal devices.

15. The method of claim 9 further comprising generating a plurality of optical signals, each having a unique wavelength.

16. The method of claim 15 wherein generating an optical signal comprises presenting each optical signal at a plurality of optical inputs.

17. A circuit for combining optically-carried signals comprising:

a plurality of optical inputs, each optical input carrying an optical signal within one of a plurality of non-overlapping frequency bands, each optical signal concurrently modulated by a radio frequency signal associated with a respective antenna element of a phased array radar system;

a plurality of metal-semiconductor-metal photodetectors fabricated on a common substrate, each photodetector coupled to a respective optical input and producing a current relative to the modulating radio frequency signal; and a phase shifter introducing a phase shift into the currents produced by a selected plurality of the photodetectors, the phase shifted currents and the currents from the photodetectors not selected for the phase shift being combined to yield a total current;

wherein each optical signal is multiplexed with other optical signals of different frequencies, delayed by passing through dispersive and non-dispersive optical fiber and binary time delay units, and filtered out of the delayed multiplexed signal; and wherein the delay of each optical signal depends on the position within the radar system of the antenna element associated with the modulating radio frequency signal and on the beam angle of the radar system.

18. A method of combining optically-carried signals comprising:

concurrently, for each of a plurality of optical inputs, modulating an optical signal within one of a plurality of non-overlapping frequency bands by a radio frequency signal associated with a respective antenna element of a phased array radar system;

for each of a plurality of metal-semiconductor-metal photodetectors fabricated on a common substrate, receiving a respective modulated optical signal and producing a current relative to the modulating radio frequency signal;

at a phase shifter, introducing a phase shift into currents produced by a select plurality of the photodetectors; and combining the phase shifted currents and the currents from the photodetectors not selected for the phase shift to yield a total current;

wherein each optical signal is multiplexed with other optical signals of different frequencies, delayed by passing through dispersive and non-dispersive optical fiber and binary time delay units, and filtered out of the delayed multiplexed signal; and wherein the delay of each optical signal depends on the location in the radar system of the antenna element associated with the modulating radio frequency signal and on the beam angle of the radar system.

19. A circuit for combining optically-carried signals comprising:

a plurality of optical inputs, each optical input carrying an optical signal modulated by a respective radio frequency signal associated with an antenna element in a phased array radar system;

a plurality of photodetectors, each photodetector coupled to a respective optical input and producing a current relative to the modulating radio frequency signal, the produced current from each photodetector being combined to yield a total current; and a phase shifter introducing a phase shift in a select plurality of the produced currents.

20. The circuit of claim 19 wherein the photodetectors are fabricated on a common substrate.

21. The circuit of claim 20 further comprising a micro-machined layer of semiconductor material for positioning the optical inputs relative to the respective photodetectors.

22. The circuit of claim 19 wherein the optical signals are non-coherent.

23. The circuit of claim 19 wherein the photodetectors are Metal-Semiconductor-Metal devices.

24. The circuit of claim 19 wherein there are a plurality of optical signals, each having a unique wavelength.

25. The circuit of claim 24 wherein each optical signal is presented at a plurality of optical inputs.

26. A method of combining optically-carried signals comprising:

for each of a plurality of optical inputs, modulating an optical signal by a respective radio frequency signal associated with an antenna element in a phased array radar system;

for each of a plurality of photodetectors, receiving a respective modulated optical signal and producing a current relative to the modulating radio frequency signal; and introducing a phase shift in a select plurality of the produced currents; and combining the currents from each photodetector to yield a total current.

27. The method of claim 26 wherein the plurality of photodetectors are fabricated on a common substrate.

28. The method of claim 27 further comprising positioning the optical inputs relative to the respective photodetectors using a micro-machined layer of semiconductor material.

29. The method of claim 26 wherein the optical signals are non-coherent.

30. The method of claim 26 wherein the photodetectors are Metal-Semiconductor-Metal devices.

31. The method of claim 26 further comprising generating a plurality of optical signals, each having a unique wavelength.

32. The method of claim 31 wherein generating an optical signal comprises presenting each optical signal at a plurality of optical inputs.

* * * * *

UNITED STATES PATENT AND TRADEMARK OFFICE

CERTIFICATE OF CORRECTION

PATENT NO. : 6,574,021 B1
DATED : June 3, 2003
INVENTOR(S) : Leon Green and Joseph A. Preiss It is certified that error appears in the above-identified patent and that said Letters Patent is hereby corrected as shown below:

Column 1,
Line 3, please add the following paragraph:

-- This invention was made with Government support under Contract No. F30602-91-C-0133 awarded partially by Department of the Air Force. The Government has certain rights in this invention. --

Signed and Sealed this

Second Day of September, 2003

JAMES E. ROGAN
*Director of the United States Patent and Trademark Office*